United States Patent
Kriheli et al.

(10) Patent No.: US 12,083,072 B2
(45) Date of Patent: Sep. 10, 2024

(54) APPARATUS FOR SECURING DEVICE COUPLINGS

(71) Applicant: EQUASHIELD MEDICAL LTD., Tefen Industrial Park (IL)

(72) Inventors: Marino Kriheli, Tel Aviv (IL); Raanan Tavor, Yuvalim (IL)

(73) Assignee: EQUASHIELD MEDICAL LTD., Tefen Industrial Park (IL)

( * ) Notice: Subject to any disclaimer, the term of this patent is extended or adjusted under 35 U.S.C. 154(b) by 1008 days.

(21) Appl. No.: 16/966,763

(22) PCT Filed: Nov. 15, 2018

(86) PCT No.: PCT/IL2018/051233
§ 371 (c)(1),
(2) Date: Jul. 31, 2020

(87) PCT Pub. No.: WO2019/167035
PCT Pub. Date: Sep. 6, 2019

(65) Prior Publication Data
US 2021/0038475 A1 Feb. 11, 2021

(30) Foreign Application Priority Data
Feb. 27, 2018 (IL) .......................................... 257778

(51) Int. Cl.
*A61J 1/20* (2006.01)
*F16L 21/08* (2006.01)
(52) U.S. Cl.
CPC ........... *A61J 1/2096* (2013.01); *A61J 1/2065* (2015.05); *F16L 21/08* (2013.01)

(58) Field of Classification Search
CPC ...... A61J 1/2096; A61J 1/2065; A61J 1/2013; A61J 1/2055; A61J 1/14; A61J 1/1475; A61J 1/06; A61J 1/2006; A61J 1/2048; F16L 21/08
See application file for complete search history.

(56) References Cited

U.S. PATENT DOCUMENTS

| 5,468,233 | A | * | 11/1995 | Schraga | .............. | A61M 5/1782 604/407 |
| 5,697,916 | A | * | 12/1997 | Schraga | .............. | A61M 5/1782 604/207 |
| 8,196,614 | B2 | | 6/2012 | Kriheli | | |

(Continued)

FOREIGN PATENT DOCUMENTS

| EP | 2759285 A1 * | 7/2014 | ............. A61J 1/035 |
| JP | 2016512135 A | 4/2016 | |

(Continued)

OTHER PUBLICATIONS

International Search Report for PCT/IL2018/051233, mailed Feb. 21, 2019 (3 pages).

(Continued)

*Primary Examiner* — Susan S Su
*Assistant Examiner* — Eric Rassavong
(74) *Attorney, Agent, or Firm* — Whitestone Law, PLLC

(57) ABSTRACT

An apparatus for securing a male-female connection comprises: (a) a female connector comprising a securing actuator section; (b) a male connector; (c) one or more anchoring ledges; and (d) at least one rotatable gear.

18 Claims, 23 Drawing Sheets

(56) References Cited

U.S. PATENT DOCUMENTS

| | | | |
|---|---|---|---|
| 10,456,329 B2 | 10/2019 | Sanders et al. | |
| 2011/0266477 A1* | 11/2011 | Stroup | A61M 39/12 |
| | | | 251/152 |
| 2013/0096529 A1 | 4/2013 | Moradian | |
| 2015/0313798 A1* | 11/2015 | Hunter | A61J 1/201 |
| | | | 604/411 |
| 2016/0000653 A1 | 1/2016 | Kramer | |
| 2016/0151573 A1* | 6/2016 | Binninger | A61M 5/3243 |
| | | | 604/199 |
| 2017/0189619 A1 | 7/2017 | Constantineau et al. | |
| 2017/0354572 A1* | 12/2017 | Reynolds | A61J 1/1406 |
| 2018/0325776 A1* | 11/2018 | Gitman | F16B 23/0061 |
| 2020/0316360 A1* | 10/2020 | Naygauz | A61J 1/2048 |

FOREIGN PATENT DOCUMENTS

| | | | | |
|---|---|---|---|---|
| JP | 2017513613 A | 6/2017 | | |
| WO | 2013053949 A1 | 4/2013 | | |
| WO | 2013099610 A1 | 7/2013 | | |
| WO | WO-2014158724 A1 * | 10/2014 | | A61J 1/14 |
| WO | WO-2014188407 A1 * | 11/2014 | | A61J 1/20 |
| WO | 2016/120155 A | 8/2016 | | |
| WO | WO-2016120155 A1 * | 8/2016 | | A61J 1/2096 |
| WO | WO-2016199133 A1 * | 12/2016 | | A61J 1/00 |
| WO | 2017183031 A1 | 10/2017 | | |
| WO | WO-2018030481 A1 * | 2/2018 | | A61J 1/2089 |
| WO | WO-2019167035 A1 * | 9/2019 | | A61J 1/06 |

OTHER PUBLICATIONS

Written Opinion of the International Searching Authority for PCT/IL2018/051233, mailed Feb. 21, 2019 (5 pages).

\* cited by examiner

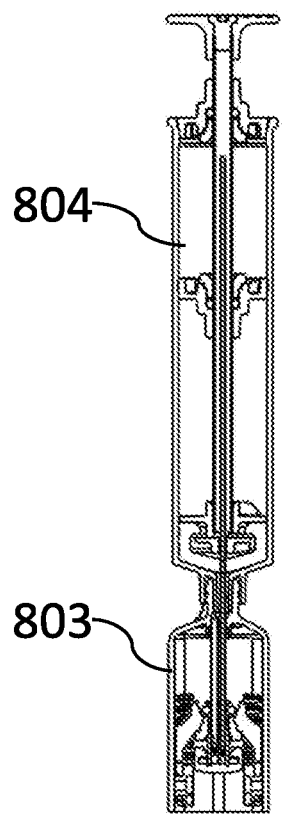
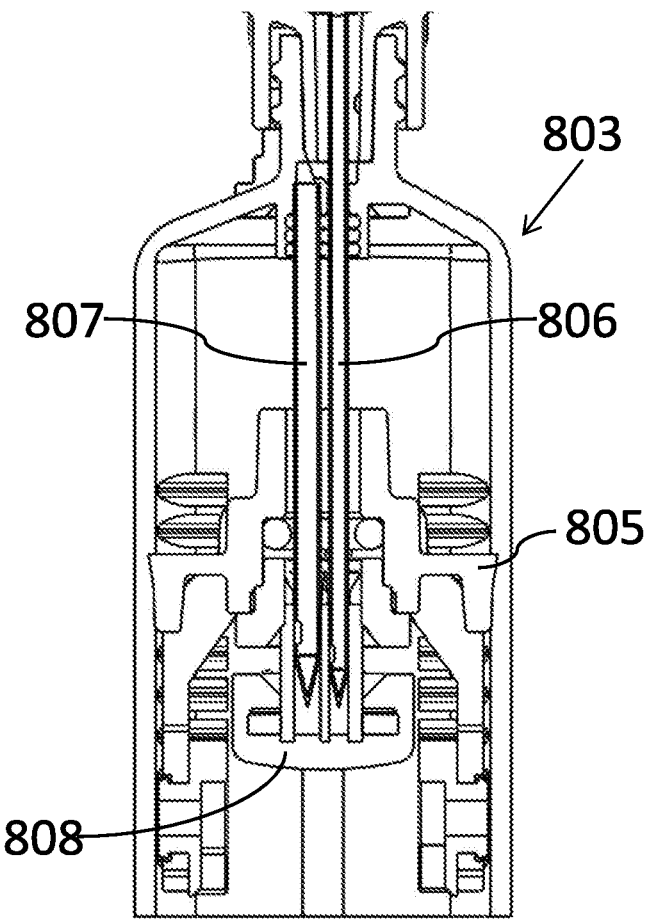
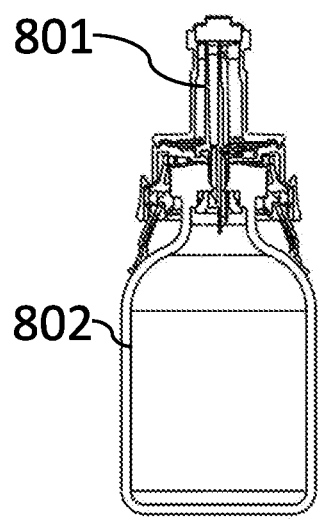
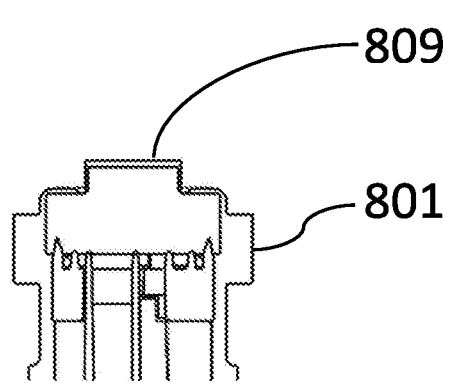
FIG. 8C
FIG. 8D

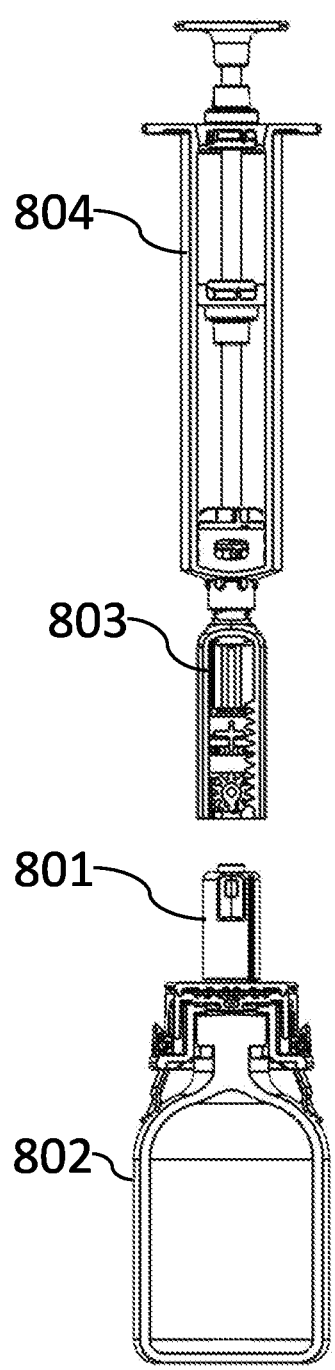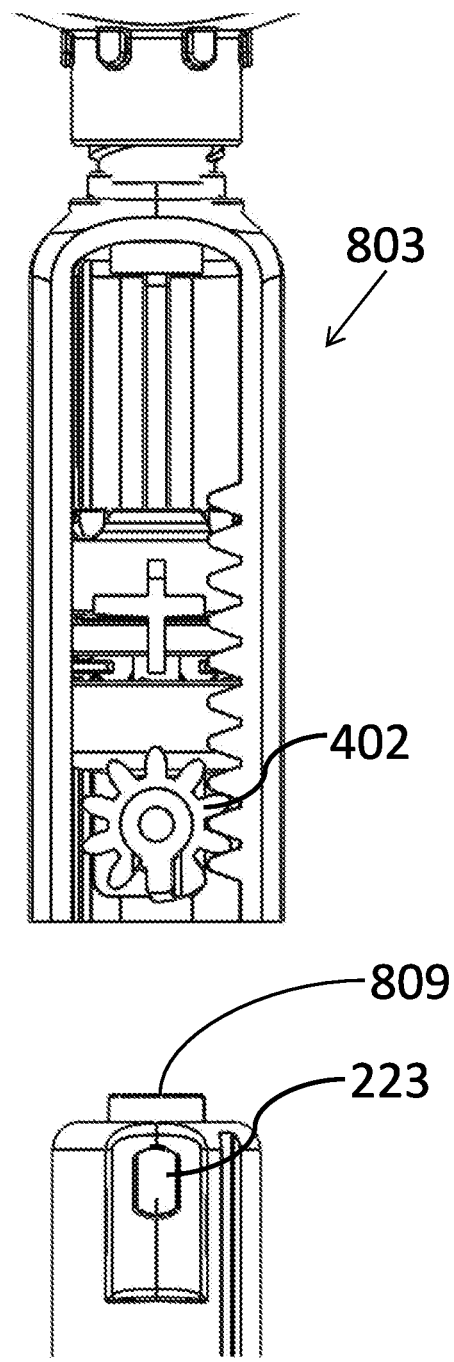
FIG. 8E
FIG. 8F

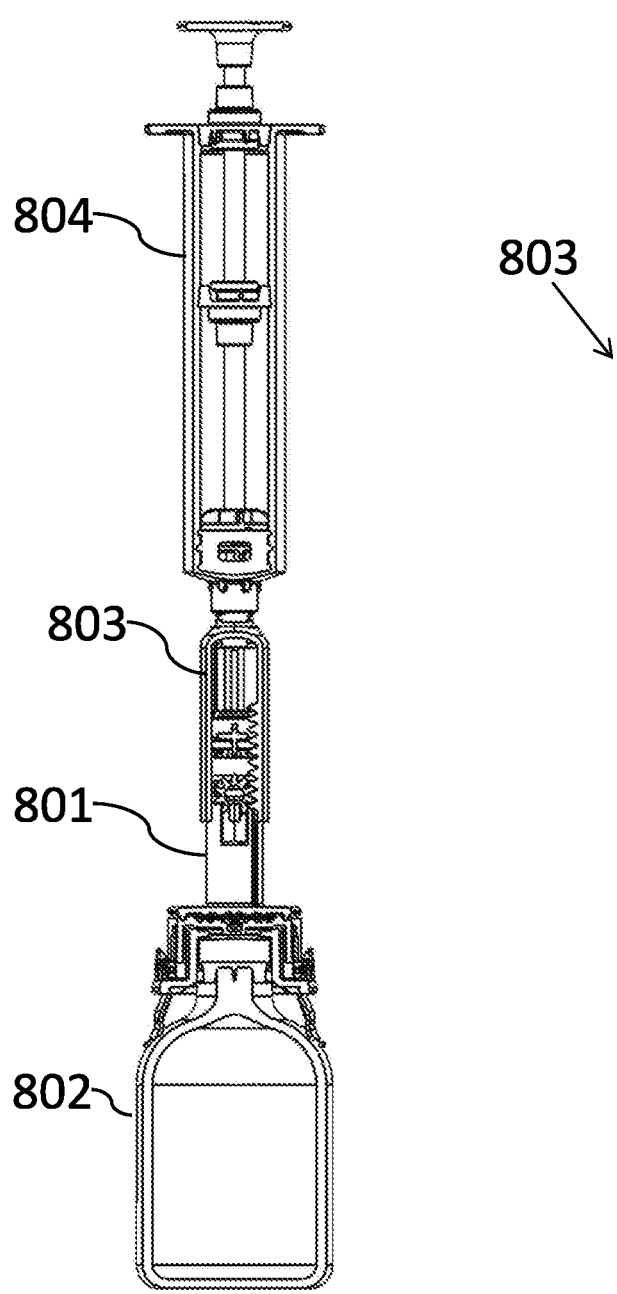
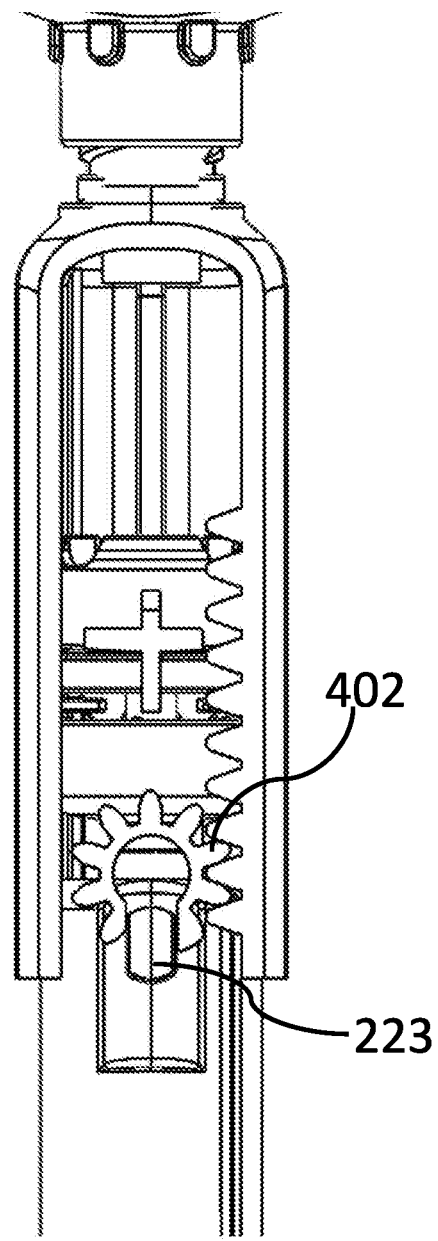
FIG. 9C    FIG. 9D

APPARATUS FOR SECURING DEVICE COUPLINGS

FIELD OF THE INVENTION

The present invention relates to medical equipment. More particularly, the invention relates to an apparatus and method for securing a physical connection between a male connector and a female connector. Still more particularly, the invention relates to the connection of elements of a liquid transfer system.

BACKGROUND OF THE INVENTION

Many devices in a wide variety of fields comprise interconnected components. Different components and applications of interconnected components require different types of connections. In some applications components are interconnected be inserting a protruding section of one of the components into a receiving section of the other component. Such a connection is referred to herein as a male-female connection.

In many applications a male-female connection requires securing means for keeping the components interconnected so as to prevent unwanted separation. Typical securing means include latches, screws, bayonet catches, resilient elements, dowels, circlips, and others. Many connecting arrangements exist, particularly in the field of dangerous liquid transfer systems. An exemplary method of securing male-female connections is disclosed in U.S. Pat. No. 8,196, 614 by the same inventor hereof, which discloses a closed system liquid transfer device designed to provide contamination-free transfer of hazardous drugs.

The procedure for assembling the fluids transfer device of U.S. Pat. No. 8,196,614 is generally illustrated in FIGS. 1A and 1B, showing elements 35a at the ends of resilient arms 35 of the female connector section 14 being squeezed into the narrow proximal section of connector section 14, thereby holding membranes 32 and 17 pressed together and engaged around the longitudinal extension and under the membrane enclosure of vial adaptor 15, thereby preventing disengagement of the double membrane seal actuator 34 from vial adaptor 15 while the needles pierce the membrane, to avoid leakage.

It is important in order to understand the invention, to appreciate the challenges that a system like that of the invention faces. Initially, it is important to understand that the performance of the coupling between the male and female connectors and the displacement of the moving parts therein, must take place in a specific order. Departure from the correct order will result in a leakage of the fluid that it is desired to transfer via the coupling, which is unacceptable when the fluid contains harmful and/or potent chemicals, such as is the case for instance with antineoplastic drugs. Secondly, in order to ensure a safe handling of the materials during the coupling, the relative movement of the various moving parts of the assembly must take place smoothly and consistently. Meeting those challenges is an object of the present invention.

Due to the great importance in maintaining a safe male-female connection, it is important to improve the level of control of the engagement and the disengagement of male-female connected components and devices, beyond that which is afforded by devices currently known in the art.

It is therefore also an object of the present invention to provide an apparatus for controlling the disengagement of male-female connections.

It is another object of the present invention to provide an apparatus for controlling the engagement and the disengagement of male-female connections that is convenient to operate.

It is yet another object of the present invention to provide an apparatus for controlling the engagement and the disengagement of male-female connections that can be used in systems that include one or more needles and in needleless systems.

It is still a further object of the invention to provide apparatus that can be safely used to transfer fluids between two separate components of the system, while avoiding the escape of dangerous liquids, aerosols or vapor into the surrounding atmosphere.

Other objects and advantages of the invention will become apparent as the description proceeds.

SUMMARY OF THE INVENTION

Described is an apparatus for securing a male-female connection, comprising:
(a) a female connector comprising a securing actuator section;
(b) a male connector;
(c) one or more anchoring ledges; and
(d) at least one rotatable gear.

According to an embodiment of the invention, said rotatable gear comprises or has attached a void portion suitable to house an anchoring ledge provided opposite to it. In another embodiment, a gap is formed in the void portion such that the void section is provided with an opening the orientation of which changes with the rotation of the gear. In a further embodiment of the invention, the apparatus comprises at least one or more sprockets peripherally arranged around the gear.

The at least one or more rungs can be formed on the female connector, or can be formed on the male connector and is suitable to move relative to the gears when the male connector slides inside the female connector.

According to one embodiment, at least one rail or guide is formed on the interior of the female connector. In this is embodiment, a track can be provided between a rail or guide and one or more rung(s), along which a gear may travel longitudinally. In one embodiment of the invention the apparatus comprises two of each of anchoring ledges, ladder and rotatable gear.

Each of the female connector section and the male connector can be coupled to an element of a fluids-transfer system. Alternatively, one or both of the female connector section and the male connector can be provided as an integral part of an element of a fluids-transfer system. For instance, the female connector section can be connected to a syringe, to a female or male luer or luer-lock port, to tubing, to a vial adaptor, to a spike, or to any other suitable fluid transfer element.

Similarly, the male connector can be connected to a female or male luer or luer-lock port, to tubing, or to any other suitable fluid transfer element.

According to one embodiment of the invention, the axis around which the at least one rotatable gear rotates is essentially perpendicular to the plane in which lies the axis along which the female and male connectors slide.

The invention also encompasses an element of a fluids-transfer system coupled, or otherwise connected to, a female connector section, or to a male connector, as herein described.

The invention is further directed to a drug-transfer system, comprising apparatus as herein described.

Further provided by the invention are syringe adaptors, tubings, and all elements of a fluids transfer system, as described herein.

As will be apparent to the skilled person, many different mechanical setups can be provided according to the invention and without exceeding its scope. For instance, the rotatable gear mechanism may comprise two rungs and one sprocket, or an indentation suitable to be engaged by a rung, or a rung which is adapted to be engaged by two sprockets, or a rung adapted to engage an indentation, all of which fulfill the requirements of the invention.

The anchoring ledges can be provided on the male connector and the rotating gears can be located on the female connector, or the anchoring ledges can be provided on the female connector and the rotating gears can be located on the male connector.

According to still a further embodiment of the invention, the female connector is provided with a rotatable gear, which is rotatably attached to an axis positioned at a radial distance from the center of said gear.

All the above and other characteristics and advantages of the invention will become apparent from the detailed description of some specific examples, with reference to the appended drawings.

BRIEF DESCRIPTION OF THE DRAWINGS

In the Drawings:

FIG. 8C is a cross-section of FIG. 8A;

FIG. 8D is a partial, enlarged view of FIG. 8C;

FIG. 8E is a cross-section of FIG. 8B;

FIG. 8F is a partial, enlarged view of FIG. 8E;

FIG. 9C shows a cross-section of the male and female connectors of FIG. 9A, in a second position in which they have brought into close proximity but are not yet touching, viewed from the side;

FIG. 9D is a partial, enlarged view of FIG. 9C;

DETAILED DESCRIPTION OF THE INVENTION

Reference will now be made to an embodiment of the present invention, examples of which are provided in the accompanying figures for purposes of illustration only. One skilled in the art will readily recognize from the following description that alternative embodiments of the structures and methods exemplified herein may be employed, mutatis mutandis, without departing from the principles of the invention.

It should be understood that the securing actuator is housed inside the female connector and displaceable within it. For the sake of simplicity in the description to follow whenever reference is made to the female connector, it is understood that it is meant to refer to the female element inside which the securing actuator is displaceable.

Figure 1A:
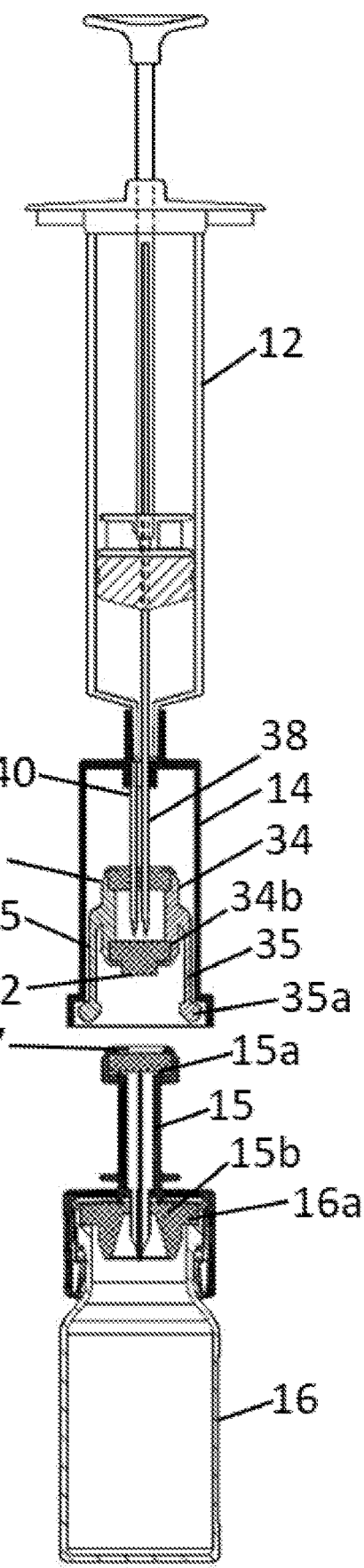
FIGS. 1A and 1B schematically illustrate a prior art drug transfer device.
Figure 1B:
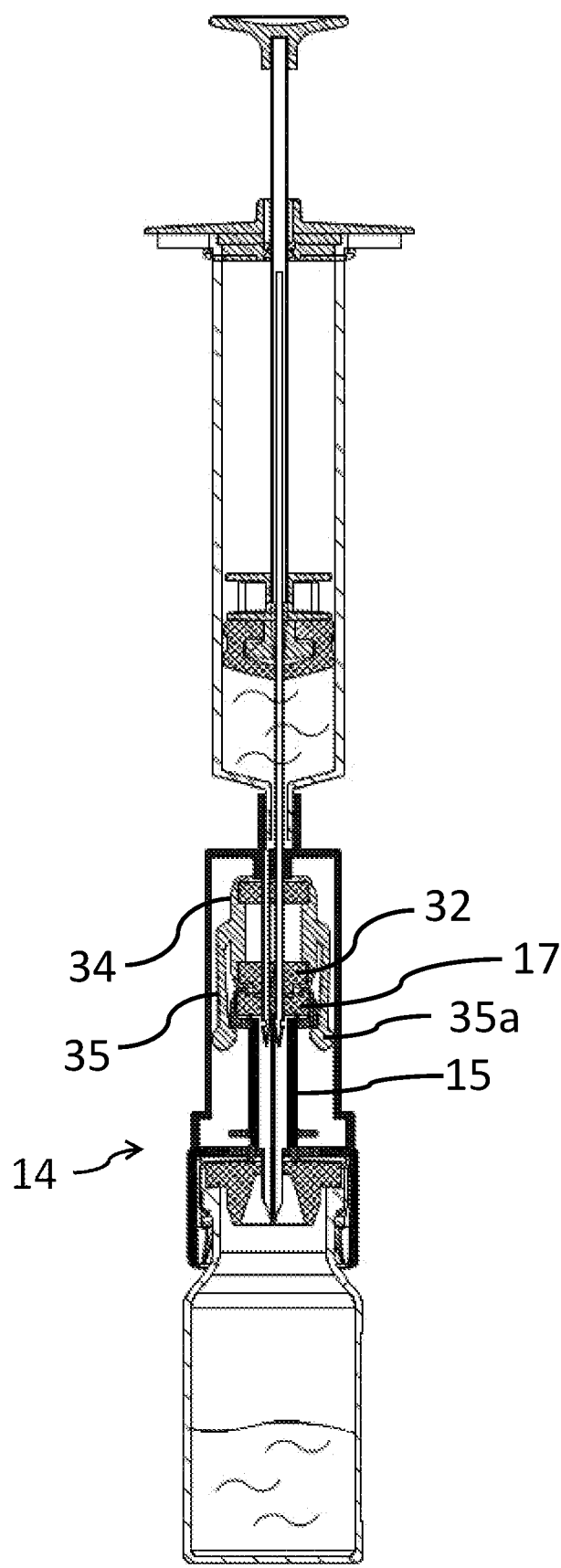
Figure 2A:
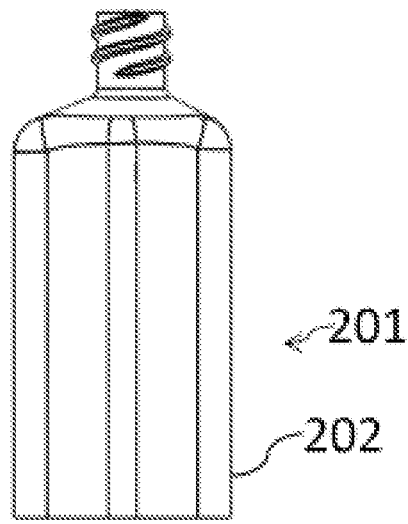
FIG. 2A schematically illustrates a front view of a female connector and its corresponding male connector according to an embodiment of the present invention.
Figure 2A:
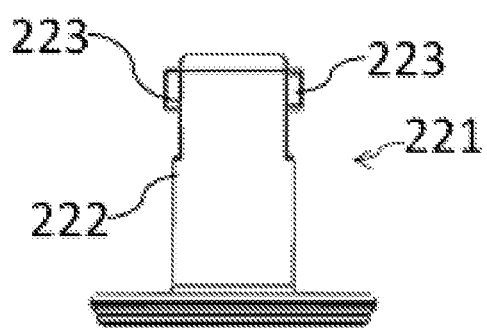
Figure 2B:
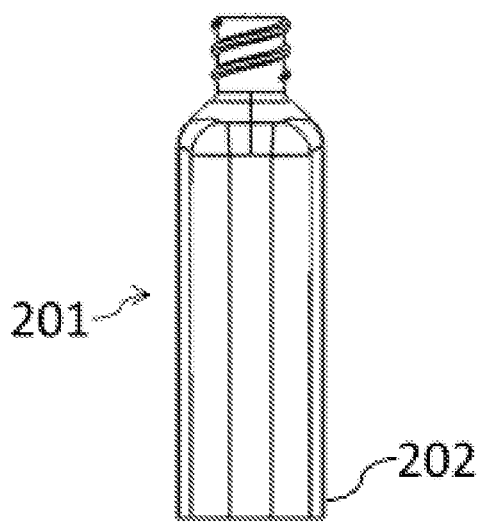
FIG. 2B schematically illustrates a side view of a female connector and its corresponding male connector according to an embodiment of the present invention.
Figure 2B:
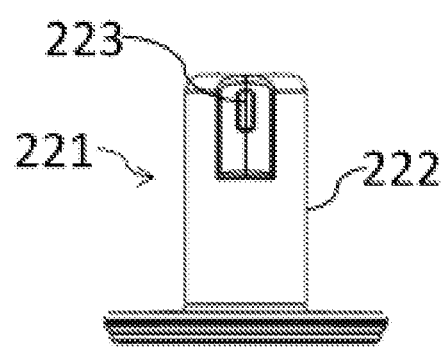

FIGS. 2A and 2B schematically illustrate front and side views, respectively, of a female connector 201 and a male connector 221, broadly designed according to the principles of an embodiment of the present invention, which are configured to be interconnected by inserting protruding section 222 of the male section into receiving section 202 of the female connector. Anchoring ledges 223 are fixedly attached at the distal (top) side of protruding section 222, as shown in FIGS. 2A and 2B. The function of ledges such as ledges 223 are explained below.

Figure 3A:
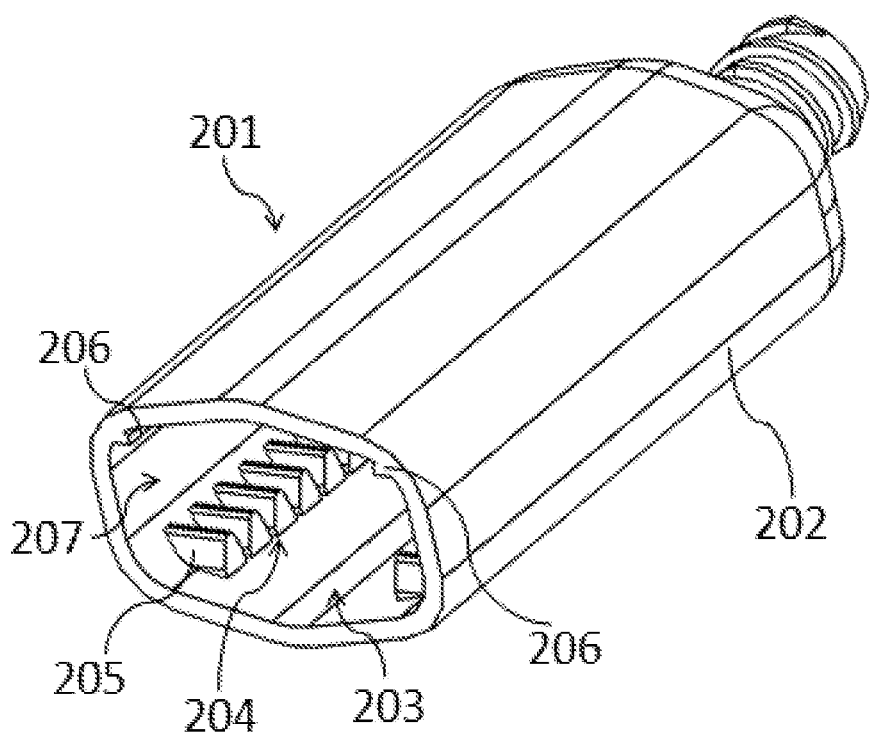
FIG. 3A schematically illustrates a perspective view of a female connector body, according to an embodiment of the present invention.
Figure 3B:
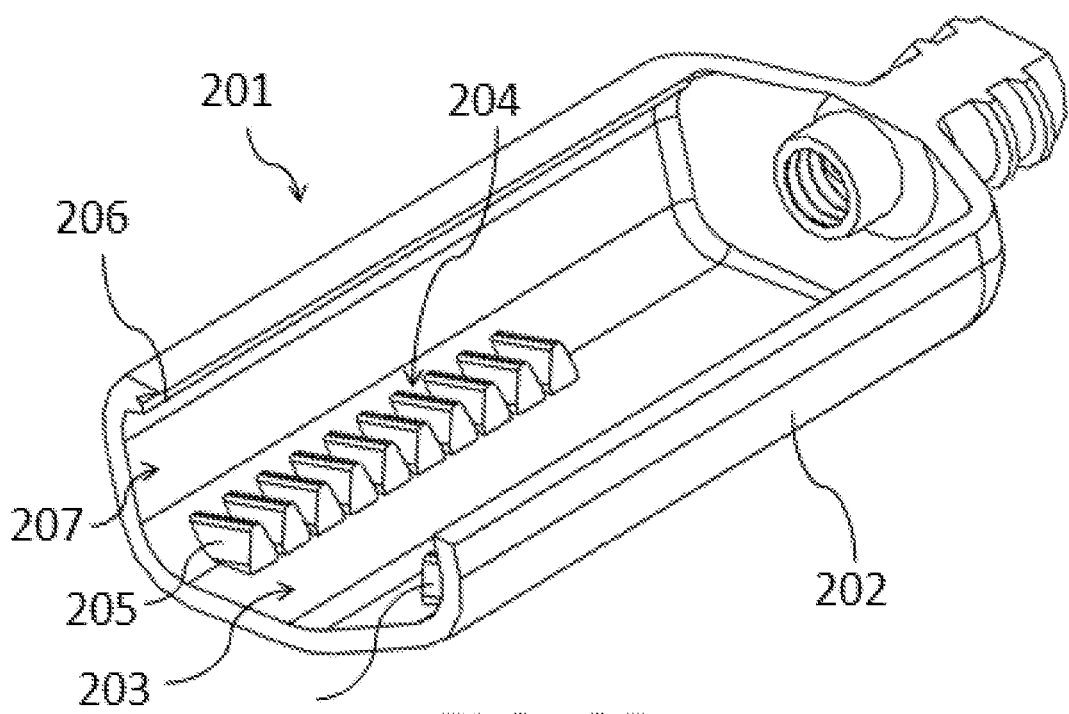
FIG. 3B is the female connector body of FIG. 3A, with one of the outer walls cut away to show the interior.

FIG. 3A is a perspective view of the body of female connector 201, according to an embodiment of the present invention, in which the interior of receiving section 202 is visible through an opening 203 in the proximal side of connector 201. FIG. 3B is a cutaway perspective view of female connector 201 of FIG. 3A. A ladder 204 comprising a plurality of rungs (e.g. 205), is formed on the front or back side of each of the left and right sides of the interior of receiving section 202. A rail 206 is formed on the opposite (i.e. back or front) side of each of the left and right sides of the interior of receiving section 202. A track, generally indicated by numeral 207, is defined between rail 206 and ladder 204, along which a gear may travel longitudinally, given that the gear comprises sprockets the size of which corresponds to the spaces between rungs 205.

Figure 4:
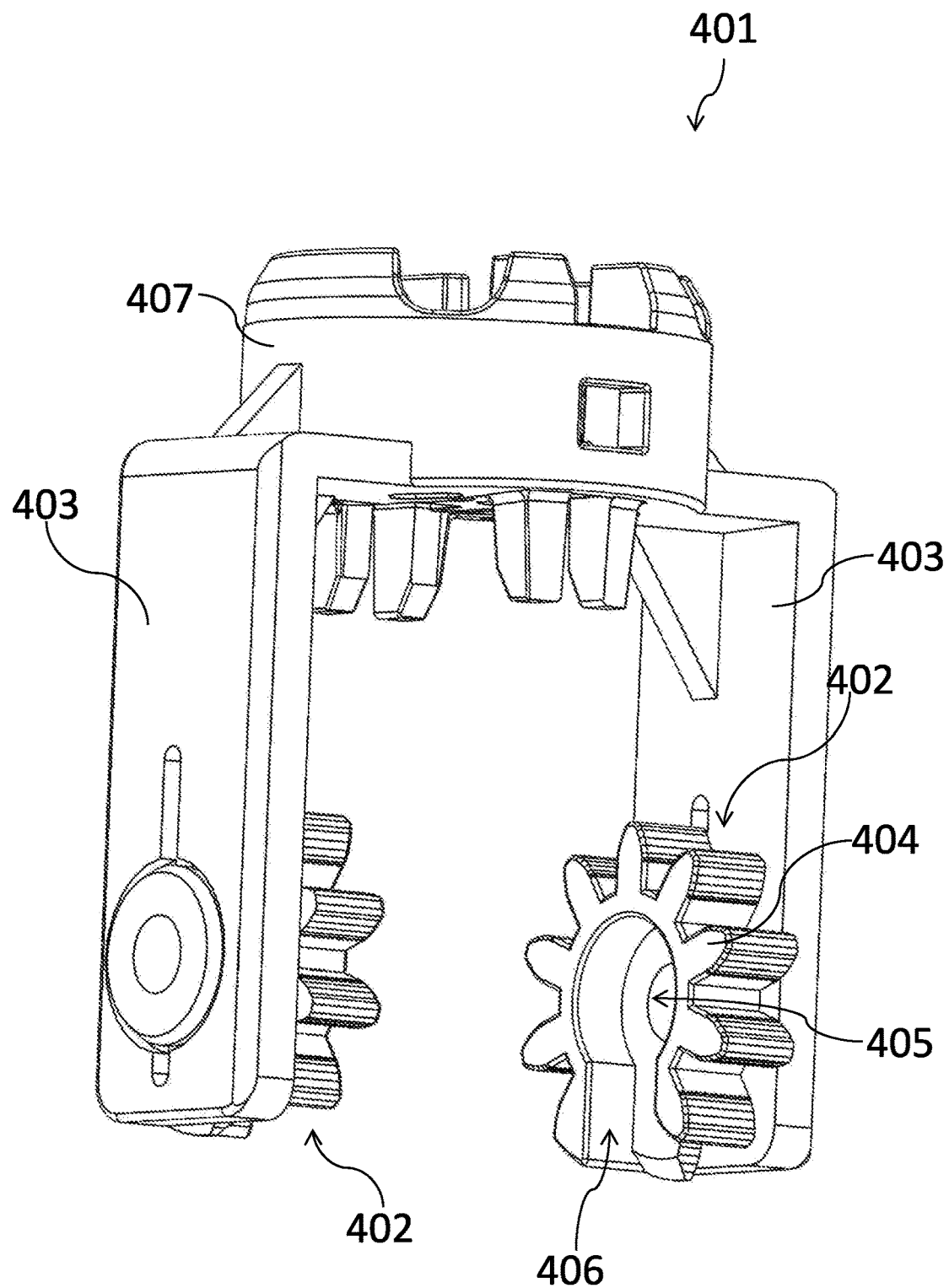
FIG. 4 is a perspective view of a securing actuator, according to an embodiment of the present invention.

FIG. 4 is a perspective view of a securing actuator 401, according to an embodiment of the present invention, comprising rotatable gears 402, rotatably coupled to a guide 403 on each side of a base 407. Each gear 402 comprises a plurality of sprockets (e.g. 404) peripherally arranged around a void portion 405, whereas a gap 406 is formed by removal of a portion of the periphery thereby allowing access from beyond the gears' periphery to the void portion.

Figure 5:
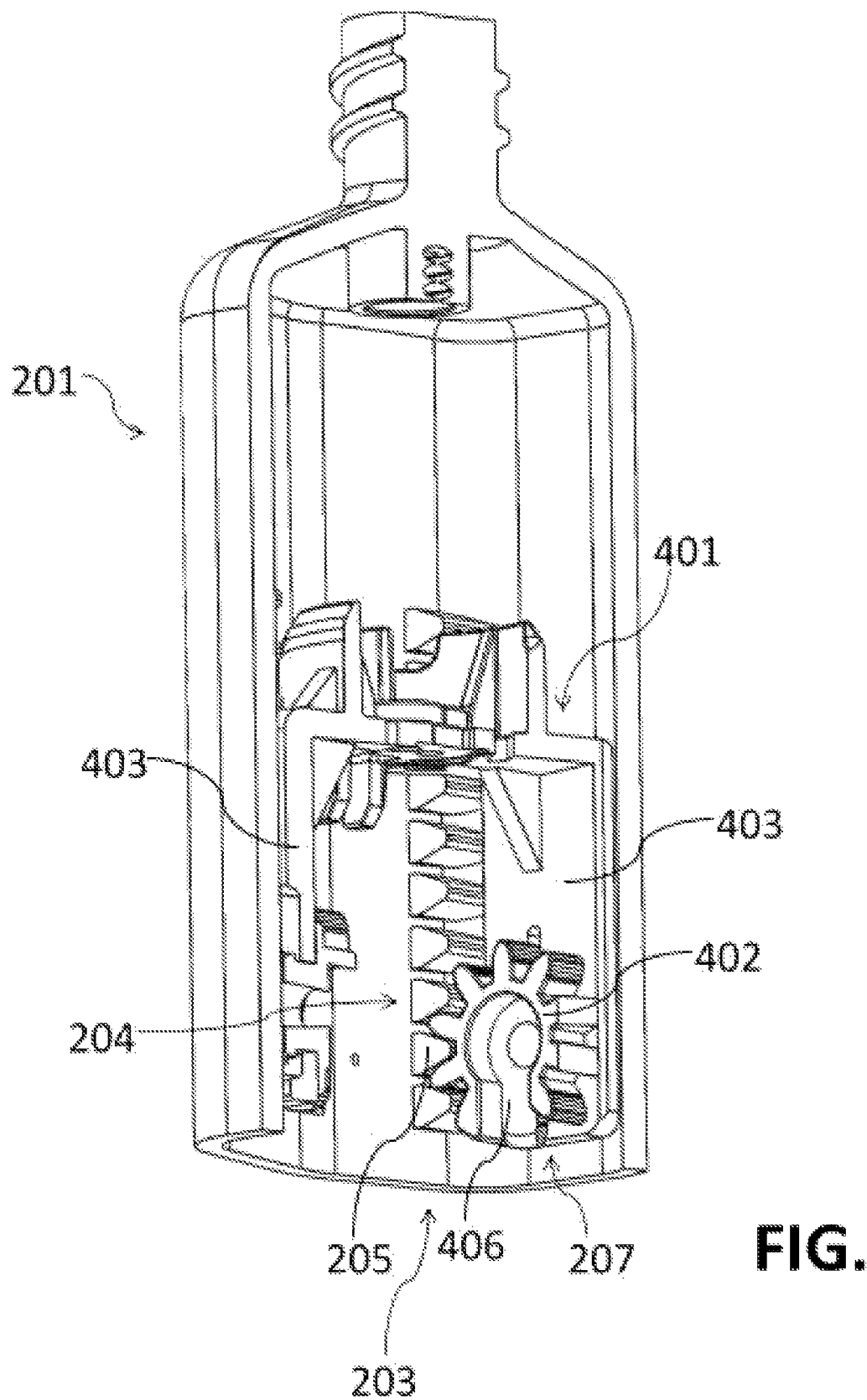
FIG. 5 is a cutaway perspective view of the female connector body of FIG. 3 with the securing actuator of FIG. 4 present therein, according to an embodiment of the present invention.

FIG. 5 is a cutaway perspective view of female connector 201 with securing actuator 401 present therein, according to an embodiment of the present invention. Guides 403 are located at tracks 207 such that sprockets of each gear 402 are inserted between the rungs 205 of the ladder 204. Longitudinal motion of actuator 401 along the tracks causes gears 402 to rotate due to the sprockets being forced to rotate about their axis of rotation. Accordingly, the orientation of gap 406, relative to opening 203, changes with the longitudinal motion of actuator 401.

Figure 6A:
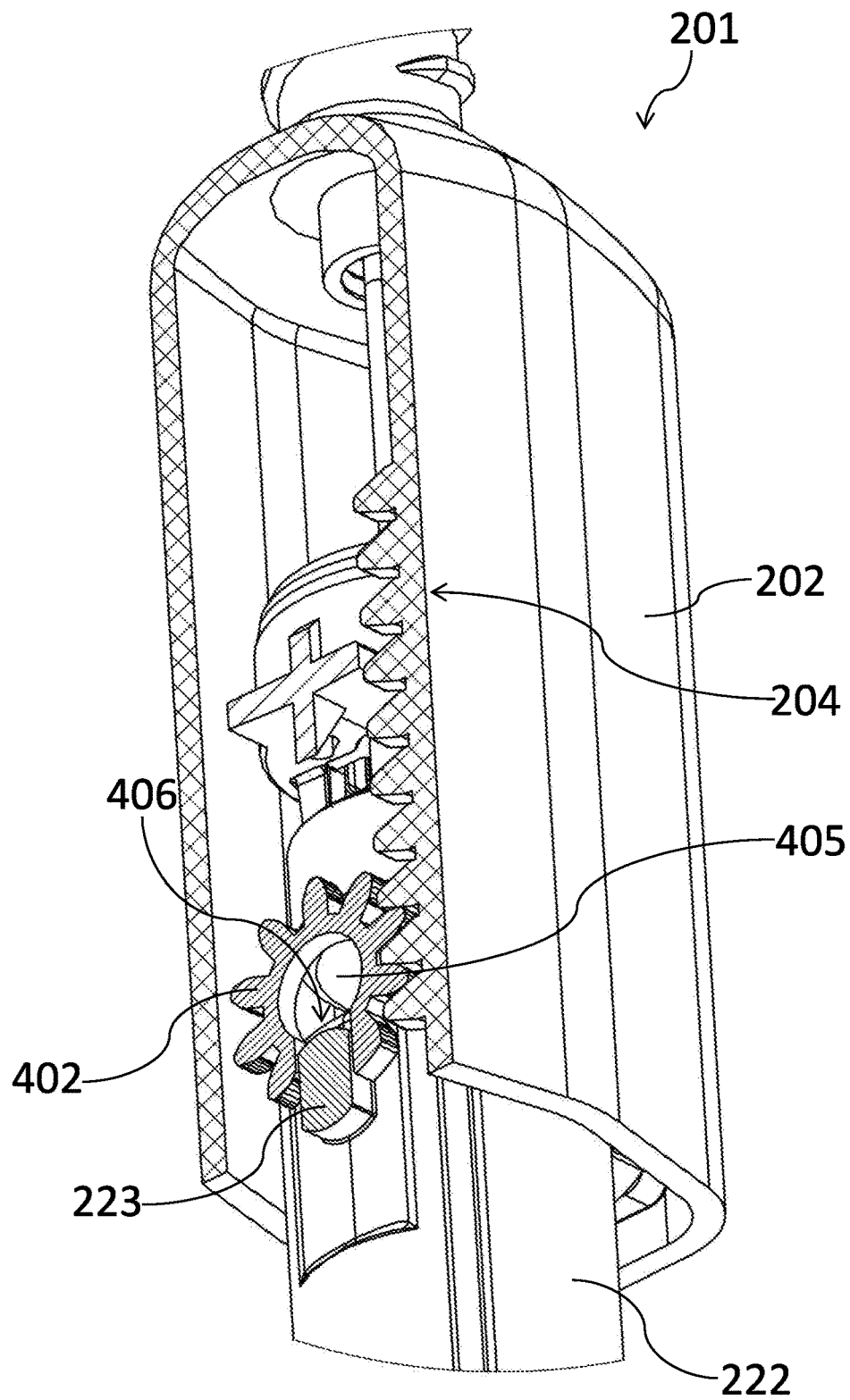
FIGS. 6A-6C are cutaway perspective views of the male section inserted into of the female connector in multiple sequential positions, according to an embodiment of the present invention.
Figure 6B:
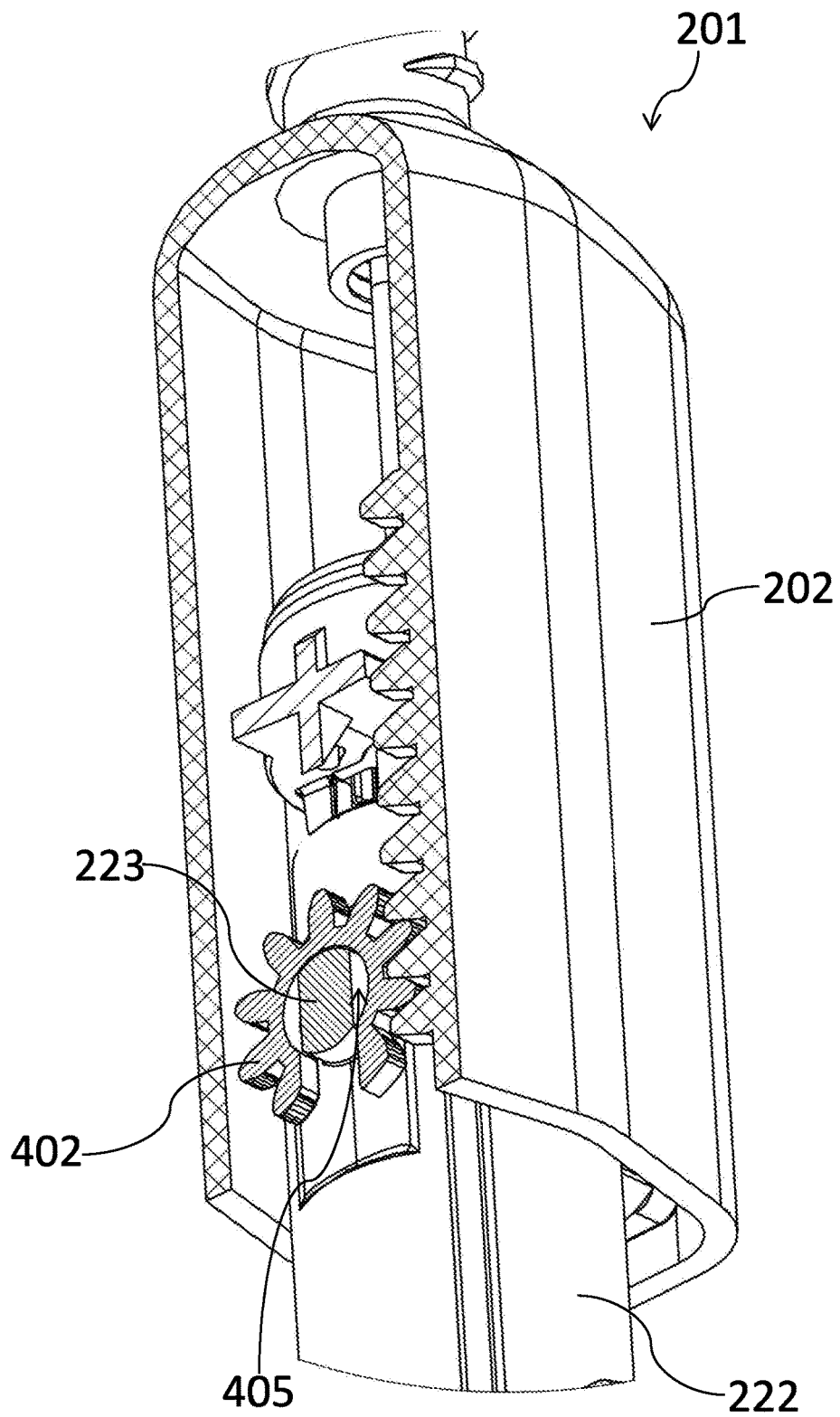
Figure 6C:
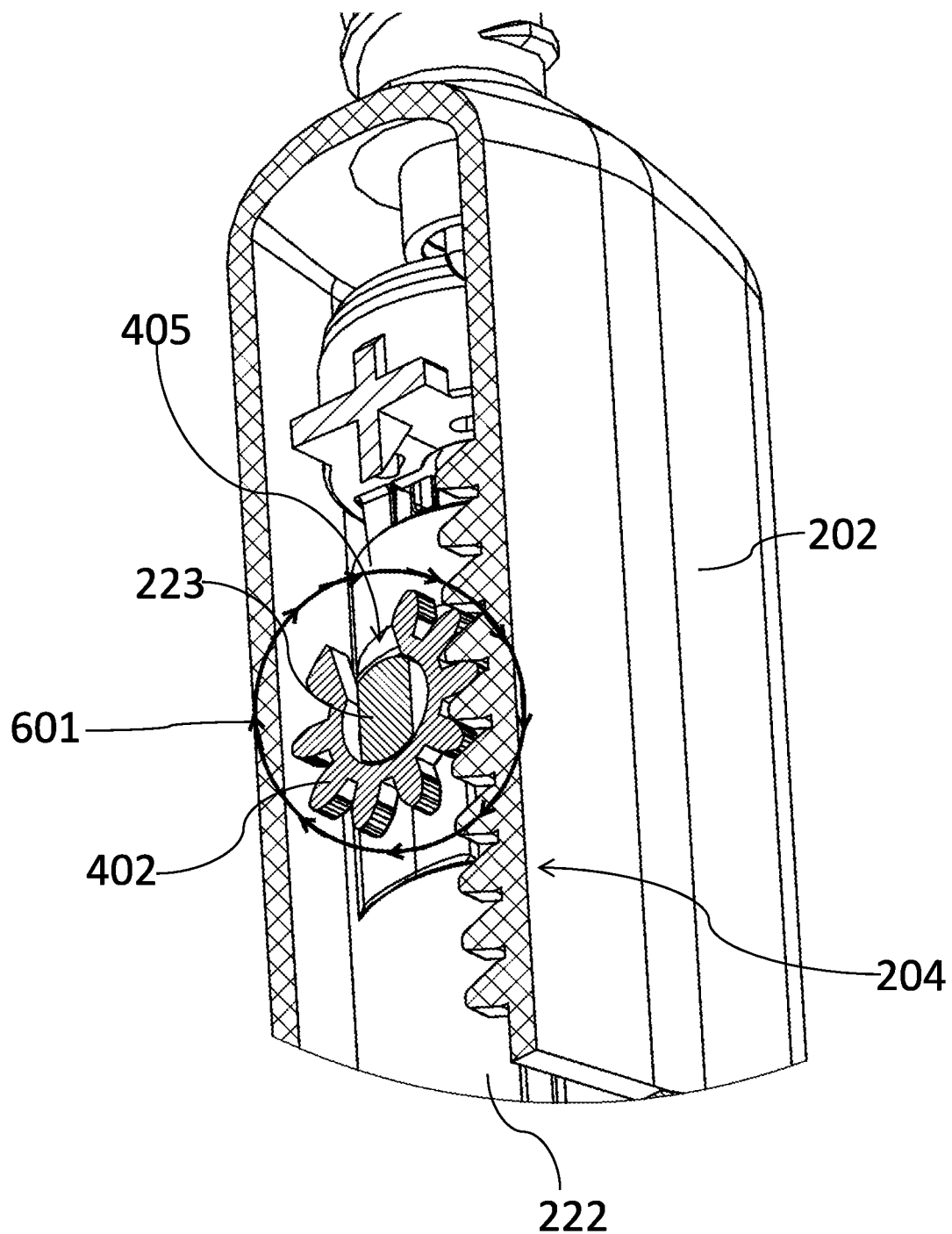

FIGS. 6A-6C show perspective views of protruding section 222 of a male connector inserted into receiving section 202 of the female connector 201 (shown in cutoff view), according to an embodiment of the present invention. The width of ledges 223 correspond to the size of gaps 406 such that ledges 223 may pass through gaps 406 and be housed into void portions 405. The height and depth of ledges 223 correspond to the diameter and depth of void portions 405, respectively, such that a gear 402 may rotate freely while a ledge 223 is present inside the void portion 405. FIG. 6A shows a ledge 223 being inserted through gap 406 into void portion 405. In this position the rotation of gears 402 is disabled because the gear's gaps 406 hit the ledges 223 from thew side and subsequently any movement of the entire actuator 401 is disabled. Such disabling of movement is useful to allow a process of squeezing elastic membranes that takes place in parallel at this process stage, as will be further described in detail with regards FIGS. 12 A-C. Upon further insertion of protruding section 222 into receiving section 202, ledge 223 completely passes through gap 406 and is accommodated within the void portion 405, as shown in FIG. 6B. Upon yet further insertion of protruding section 222 into receiving section 202, gear 402 rotates according to the direction dictated by ladder 204 (i.e. clockwise in the embodiment show in FIG. 6C, as indicated by the circular arrow 601). Upon initial rotation of gear 402, the ledges 223 get trapped and locked inside void portion 405 and remain locked throughout the entire connection and disconnection processes. For the abovementioned process of two elastic membranes compression, the moment of initial rotation of gears 402 means a precise locking position of the membranes in a specific inseparable squeeze. A further insertion of protruding section 222 into receiving section 202 causes the locked membranes to be pierced over stationary needles of the female connector.

In the position of actuator 401 shown in FIG. 6C it is impossible for the ledges to leave void portion 405, and therefore proximal displacement of the protruding section 222 of the male connector 221 is prevented, unless gear 402 is rotated and ledges 223 are released from the gears. Obviously, as will be apparent to the skilled person, in any position of the gear 402 among ladder 204 in which gap 406 is not opposite opening 203, the ledges 223 are kept inside void portion 405.

At disconnection of the female connector 201 from the male connector 221 the process is reversed, extracting of protruding section 222 out of the receiving section 202 causes the gear 402 to rotate counter clockwise among ladder 204 until the ledges 223 come opposite gap 406 and are able to leave the void portion 405. During disconnection in the above mentioned in parallel taking process, first the needles retract from the membranes and at the moment ledges 223 come opposite gap 406 and leave the void portion 405 the membranes separate safely leaving their surfaces clean of any residuals of liquids (see description below referring to FIGS. 12 A-C).

FIGS. 5 and 6 show a situation in which rungs 205 are located on the female part of the assembly. However, as will be apparent to the skilled person, it is also possible to position rungs on the male part of the assembly (the male connector), such that they will move relative to the gears as the female part (the female connector) slides over the male part, resulting in a rotation of the gears. Similarly, it is possible to switch the location of the ledges and the gears, by placing the rotating gears on the male portion and the ledges on the actuator.

As will be easily apparent to the skilled person, while the figures are provided for clarity with a set of two gears and a plurality of rungs, the number of rungs can be limited to very few, since the required rotation is small. The actual number of rungs used will be dictated by the required rotation and by the size of the various parts and will be easily determined by the skilled person.

Figure 13A:
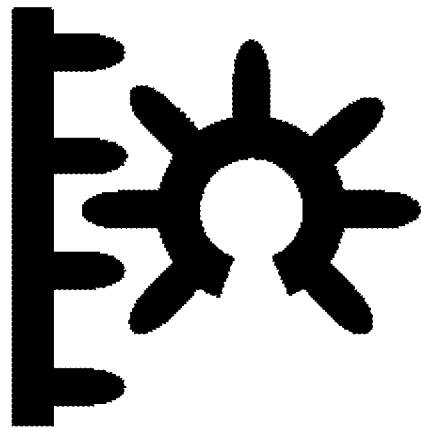
FIGS. 13 A-E schematically illustrate a few alternative gear combinations.
Figure 13B:
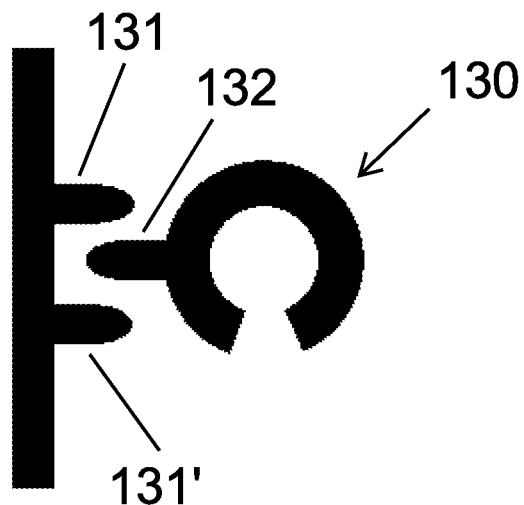
Figure 13C:
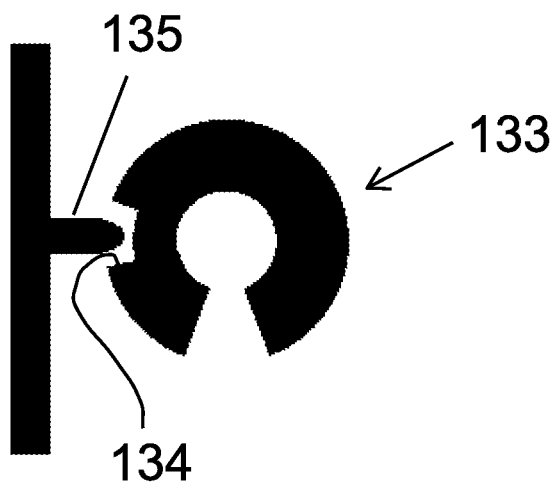
Figure 13D:
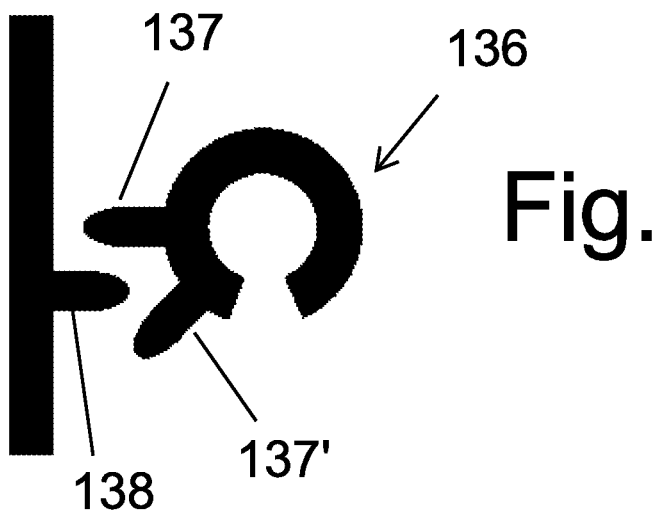
Figure 13E:
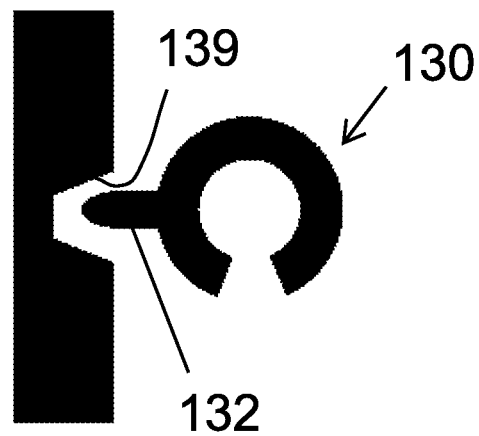

The term "gear", as used herein, should be taken to have a broad meaning and to signify any element that is suitable to accomplish a locking effect by its movement. In order to illustrate this concept, reference is made to FIG. 13 (A-E). FIG. 13A is the setup used in FIGS. 5 and 6. FIG. 13B shows a gear 130 using only two rungs, 131 and 131', and one sprocket 132. FIG. 13C shows a gear 133 in which the sprocket is replaced by an indentation 134 which is engaged by a rung 135. In FIG. 13D gear 136 has two sprockets, 137 and 137', which interact with one rung 138. FIG. 13E shows a gear 130, similar to that of FIG. 13B, which interacts with an indentation 139. As will be appreciated by the skilled person, those brought in FIG. 13 are but a few illustrative examples out of very many possible arrangements.

In devices with a secure male-female connection in which engagement or separation between the connectors must be highly controlled, the above described apparatus presents a valuable solution, inasmuch as connecting and disconnecting between the male and female connectors requires bringing the gear 402 to the proximal side of the ladder 204 (e.g. towards opening 203), thereby defining a constraint and precise point for the engagement and for the separation of the connectors.

An example where such a male-female connection apparatus is useful is in drug transfer systems, where toxic substances are transferred from a first receptacle (e.g. a vial)

to another receptacle (e.g. a syringe). Uncontrolled separation between connectors of the two receptacles and/or the needle may cause hazardous outcomes by a toxic substance being exposed.

Throughout this description when reference is made to "male connector" or "female connector", those should be understood as referring to the parts of an assembly that participate in the coupling process, regardless of the additional system elements to which they are connected. For example and as will be further discussed below, the male connector can be coupled to, or be integrally provided in, a vial or infusion tubing or a spike or a fluid port such as a luer-lock or in any other element of a desired fluid-transfer system. Similarly, the female connector can be coupled to, or be integrally provided in, a syringe or infusion tubing or a fluid port such as a luer-lock or to any other fluid transfer element, or can be integrally provided therewith.

Additionally, in the illustrative examples of embodiments of the invention the syringe coupled to the female connector is shown with two needles. Such double-needle systems exist in closed-system environments, such as that described in U.S. Pat. No. 8,196,614. However, as will be understood by the skilled person, the invention is not limited to be used with any particular number of needles and, for instance, closed or open systems employing only one needle may enjoy the benefits of the invention and are meant to be encompassed thereby.

Figure 7:
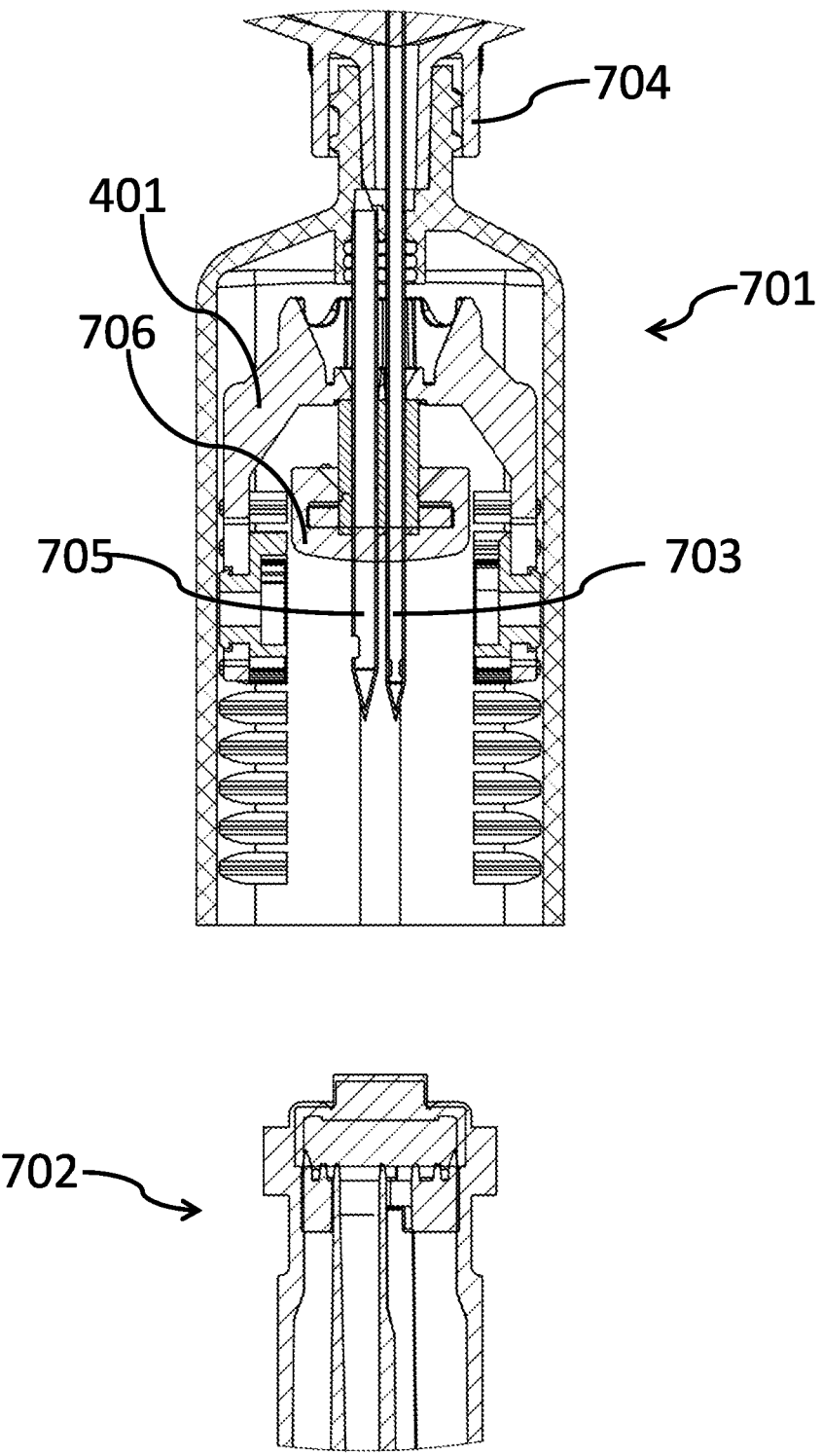
FIG. 7 is a cross-section showing the female connector where the actuator has been pushed up artificially for clarity purposes without inserting the male connector, thus exposing the needles that have passed through the actuator's membrane.

FIG. 7 schematically illustrates a drug transfer system according to a preferred embodiment of the present invention, viewed in cross-section. A female connector 701 is provided with an actuator, 401, which has been pushed upwards artificially without inserting the male connector 702, in order to show how the needles 703 and 705, which is in this particular embodiment are part of connector 701, perforate the membrane 706.

Figure 8:
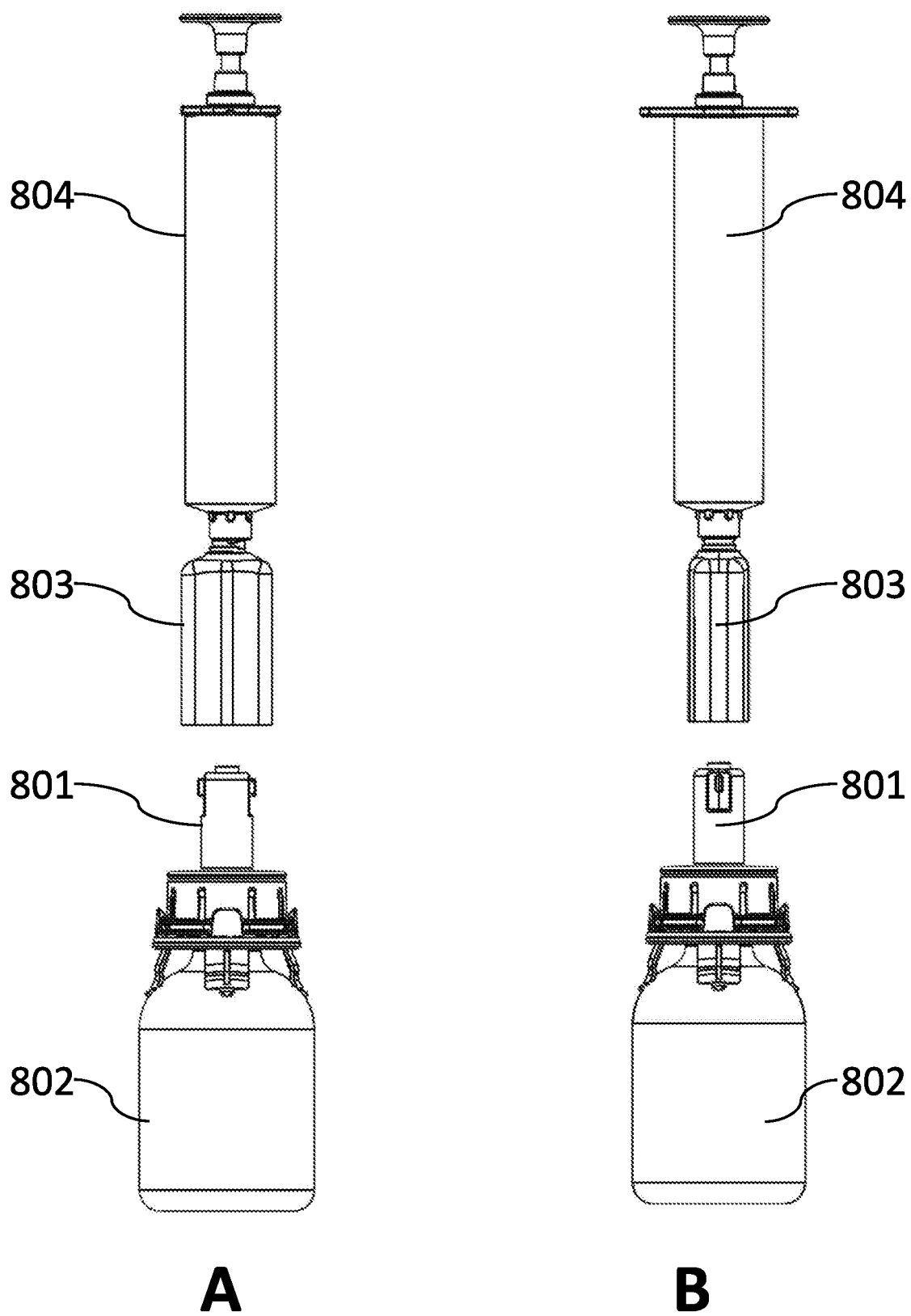
FIGS. 8 A and B show the male connector, coupled to a vial, and the female connector, coupled to a syringe, in a first position in which they have not yet come into contact, viewed from the front and from the side, respectively.

FIGS. 8 A and B show a male connector 801, coupled to a vial adaptor with vial 802, and a female connector 803, coupled to a syringe 804. The assembly is shown in a first position in which connectors 801 and 803 have not yet come into contact. FIG. 8A is a front view and FIG. 8B is a side view. The front view of FIG. 8A is seen in cross-section in FIG. 8C. FIG. 8D is a partial, enlarged view of FIG. 8C, in which the relative position of actuator 805, needles 806 and 807, and membrane 808, are clearly seen. For reference with regard to the following figures, it should be noted that membrane 809 of the male connector is to come into close contact with, and to b pressed against, membrane 808 of the actuator.

FIG. 8E is a cross-section of FIG. 8B and FIG. 8F is a partial, enlarged view of FIG. 8E, in which a gear 402 of FIG. 4 is clearly seen.

Figure 9A:
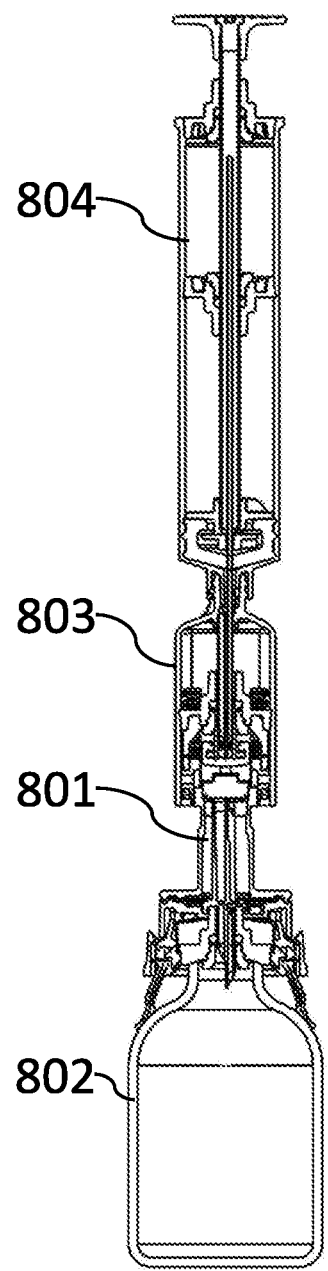
FIG. 9A shows a cross-section of the male and female connectors of FIG. 8, in a second position in which they have brought into close proximity but are not yet touching, viewed from the front.
Figure 9B:
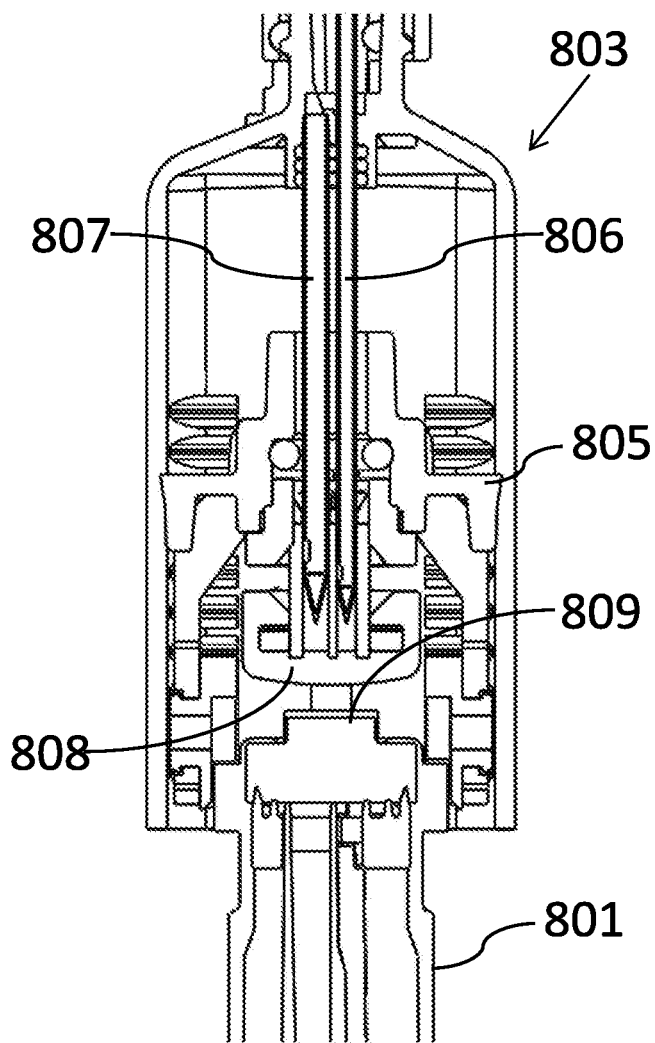
FIG. 9B is a partial, enlarged view of FIG. 9A.

FIG. 9A shows a front cross-section of the male and female connectors of FIG. 8, in a second position in which they have brought into close proximity but their membranes 808 and 809 are not yet touching. FIG. 9B is a partial, enlarged view of FIG. 9A and the same numerals used in FIG. 8D are used in this figure.

FIG. 9C shows a side cross-section of the male and female connectors of FIG. 9A, in a second position in which they have been brought into close proximity but, membranes 808 and 809 are not yet touching. FIG. 9D is a partial, enlarged view of FIG. 9C in which ledge 223 can be seeing starting to engage gear 402.

Figure 10A:
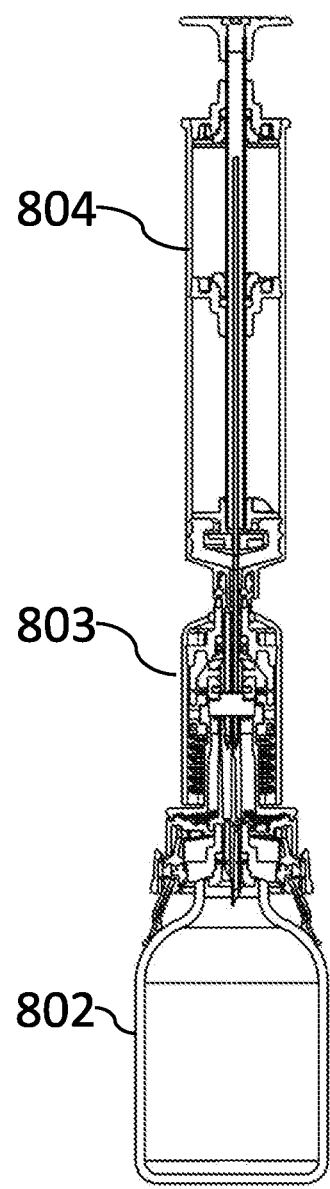
FIG. 10A shows a cross-section of the male and female connectors of FIG. 8, in a third position in which they have brought into close proximity such that their relative membranes press on one another thus preventing liquid leakage, and the needles have perforated both membranes and are located inside the vial, viewed from the front.
Figure 10B:
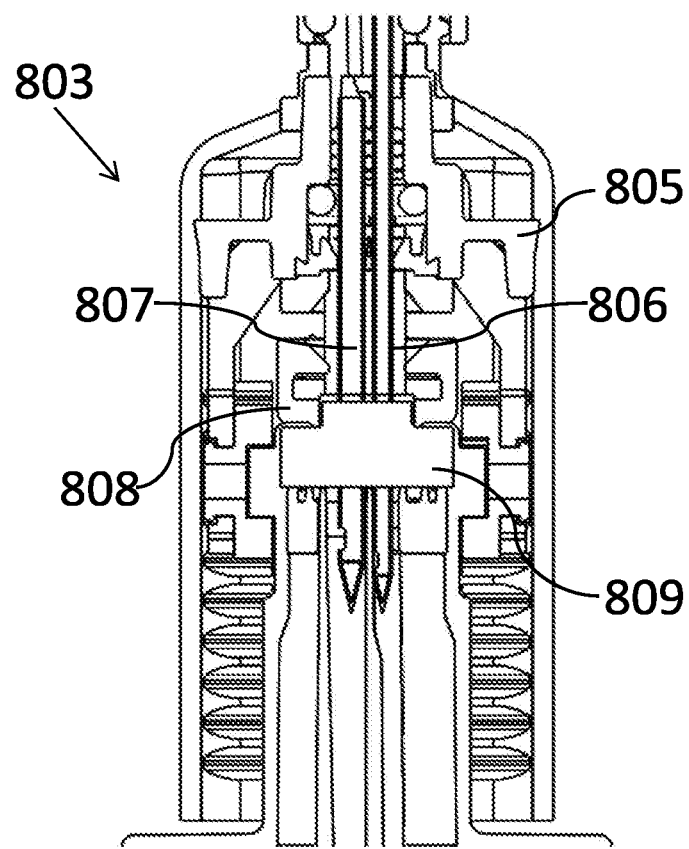
FIG. 10B is a partial, enlarged view of FIG. 10A.

FIG. 10A shows a front cross-section of the male and female connectors of FIG. 8, in a third position in which they have brought into close proximity such that their relative membranes, 808 and 809, press on one another thus preventing contact of the liquid with the membrane surfaces, and the needles have perforated both membranes and are located inside the vial. FIG. 10B is a partial, enlarged view of FIG. 10A. Male connector 801 is now completely housed inside actuator 805, within female connector 803.

Figure 10C:
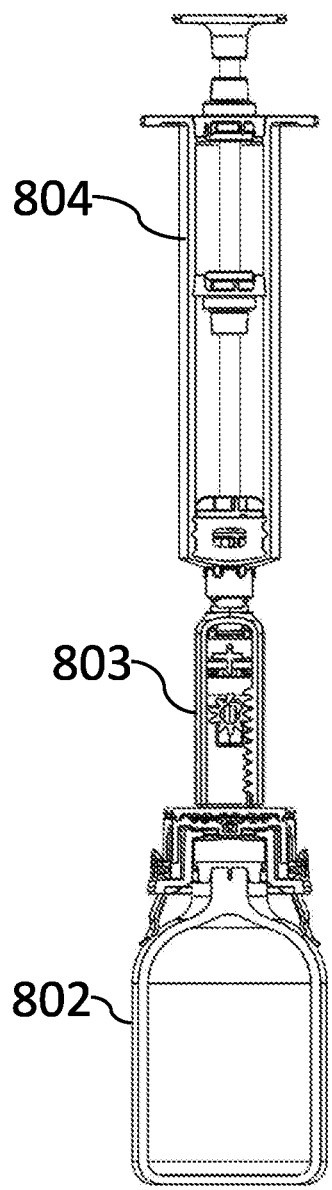
FIG. 10C shows a cross-section of the male and female connectors of FIG. 8, in a third position in which they have brought into close proximity such that their relative membranes press on one another thus preventing liquid leakage, and the needles have perforated both membranes and are located inside the vial, viewed from the side.
Figure 10D:
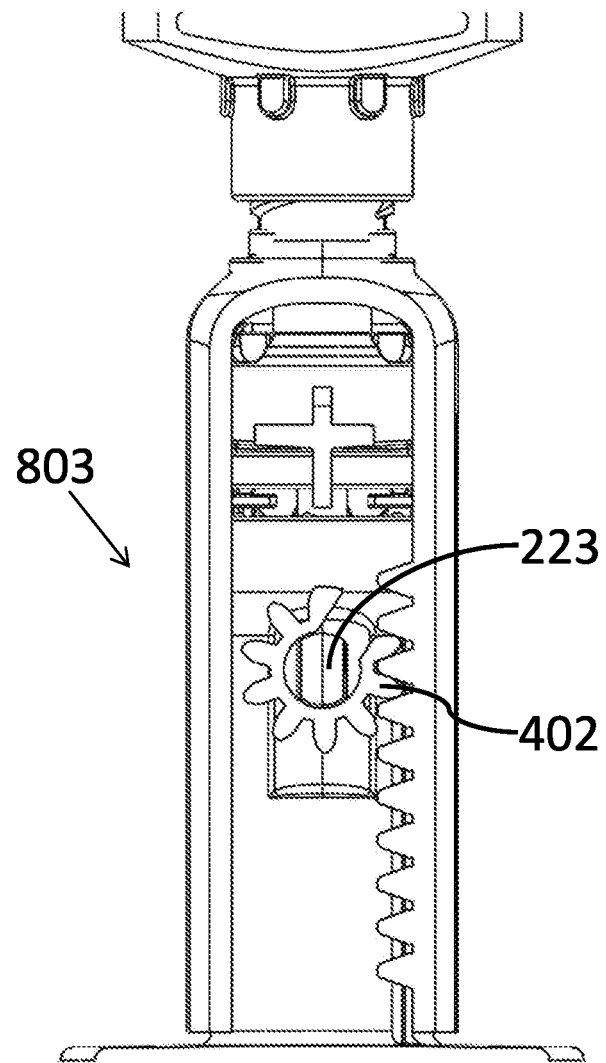
FIG. 10D is a partial, enlarged view of FIG. 10C.

FIG. 10C shows a side cross-section of the male and female connectors of FIG. 8, in a third position in which they have brought into close proximity such that their relative membranes, 808 and 809, press on one another and the needles have perforated both membranes and are located inside the vial, viewed from the side. FIG. 10D is a partial, enlarged view of FIG. 10C, in which it is seen that ledge 223 is now locked inside gear 402. The same happens on the other side of the actuator (not shown).

It should be understood that when stating that ledge 223 is "locked" inside gear 402, this should not be understood to mean that no movement is possible, since in order to release the male connector from the female connector it is sufficient to pull them apart, upon which gear 402 will rotate because of the movement of sprockets 404 along ladder 204, thus bringing the opening to a lower position, from which ledge 402 may disengage upon further pulling. What it is meant by referring to a locking position, is that while the assembly is in that position and membranes 808 and 809 are strongly pressed against one another, no unintended release of said pressure may occur. As said, in order to disengage the parts of an assembly according to the invention, a positive decision has to be made by the user and positive action must be performed to pull the assembly apart.

Figure 11A:
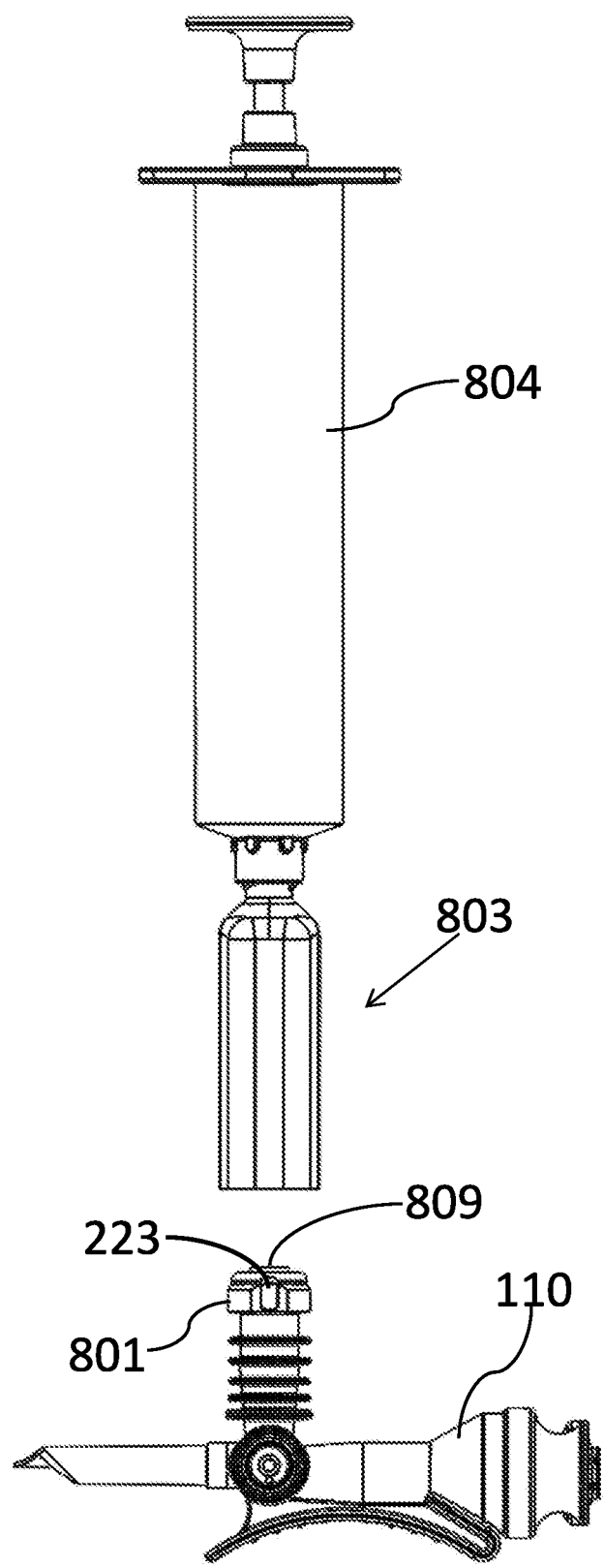
FIGS. 11 A and B schematically shows a male-female connector according to one embodiment of the invention, in which the male connector is coupled to a spike and the female connector to a syringe, before they are brought into contact, viewed from the side and from the front, respectively.
Figure 11B:
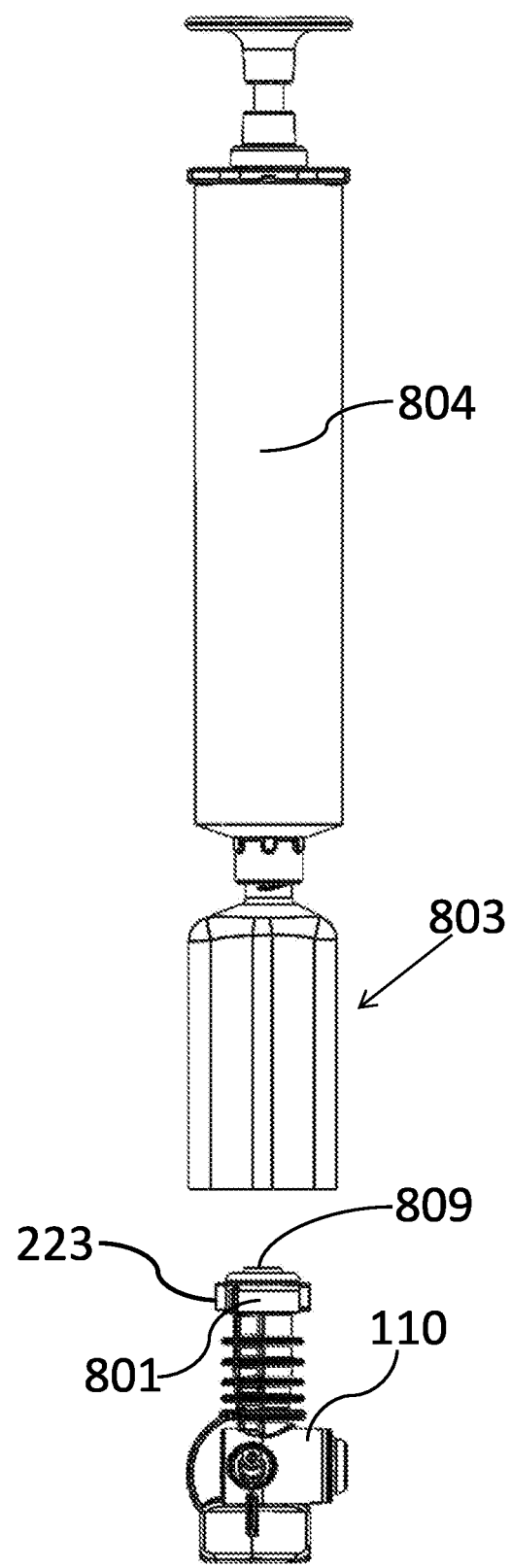

FIGS. 11 A and B schematically shows a male-female connectors according to one embodiment of the invention, in which the male connector 801 is coupled to a spike 110 and the female connector 803 to a syringe 804, before they are brought into contact. The assembly is viewed from the side and from the front, respectively. This figure illustrates how the male-female connecting assembly may be coupled to different elements of a liquid delivery system and in this example, the male connector 801 is integrally formed with spike 110.

Figure 12:
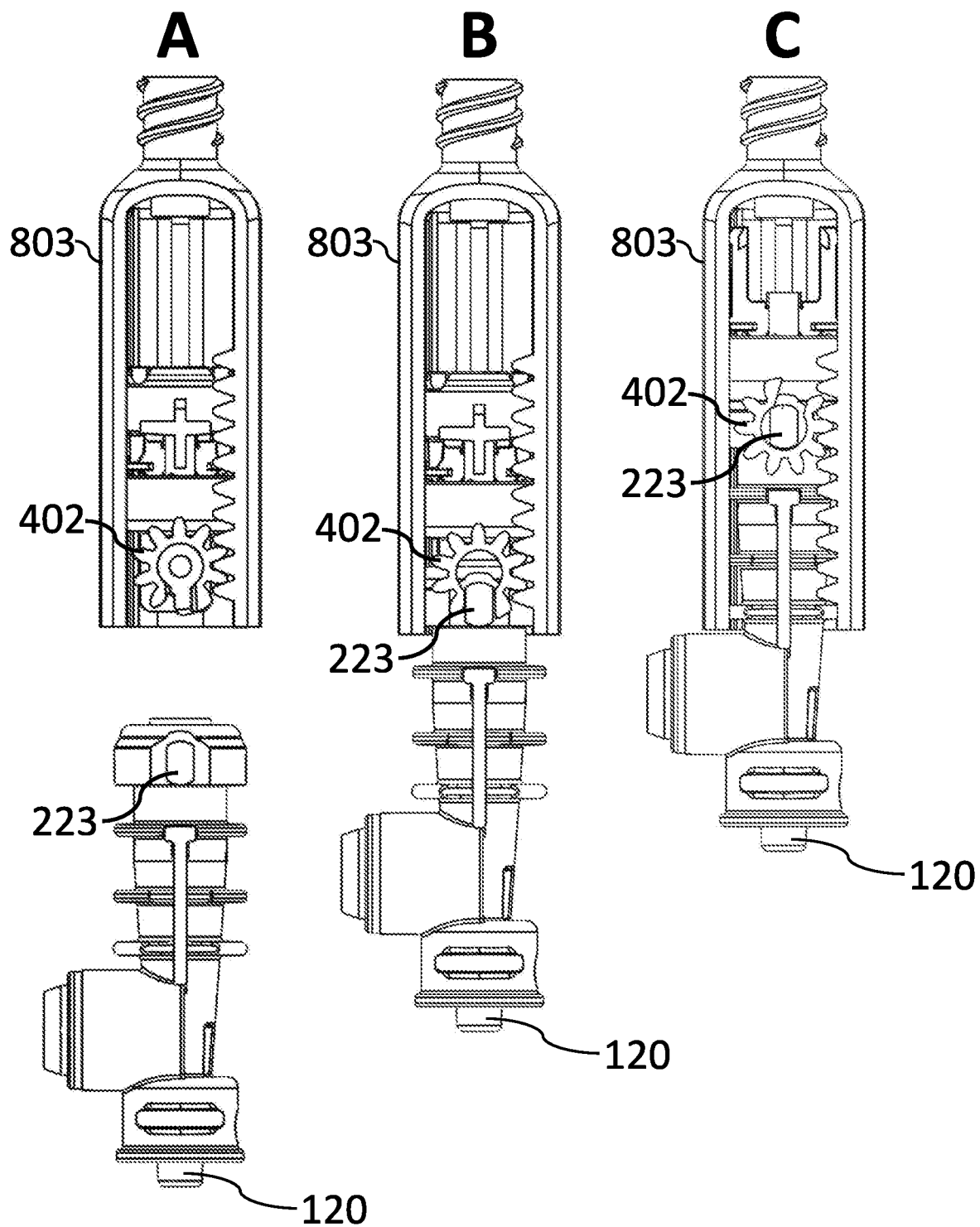
FIGS. 12 A-C are cross-sections of the device according to one embodiment of the invention, in which the male connector is coupled to a male luer-lock and the female connector to a syringe, shown before being brought into contact, during initial contact and in locked position respectively.

FIGS. 12 A-C are cross-sections of a male-female connectors according to one embodiment of the invention, in which the male connector 801 is coupled to a male luer-lock 120 and the female connector 803 to a female luer-lock 820, shown as before in three positions: before being brought into contact, during initial contact and in locked position, respectively.

Referring to the figures described above, as the male connector is distally brought into the female connector the ledges 223 further pass through gaps 406 into inside the void portion 405 of the gears, while the seal membranes 808 and 809 are pressed together, as explained in detail above with relation to FIGS. 6A-6C. As actuator 401 is additionally proximally displaced, one or more needles that are fixedly attached to the female connector penetrate the second and first seal membranes, 808 and 809, respectively.

Further insertion of the male connector into the female connector causes the one or more needles to further penetrate beyond the seal membranes and to establish a fluid path to the vial 802 through its distal side. Subsequently, the ongoing insertion of the male connector into the female connector causes the gears 402 to be rotated by the actuator 401 and guides being distally displaced by force exerted thereon by the male connector.

At the beginning of the coupling process the membranes need first to be squeezed together to a specific size and then be locked in this compression (i.e. maintained squeezed together) throughout the entire process and time of connection, i.e. from the beginning process of being punctured by the needle/s until the final needle/s retraction during uncoupling. Such dual-membranes-connection is based on a method where surfaces of two elastic membranes are pressed together to almost become a single resilient septum and then be pierced by needles. Since the pressed membrane surfaces are kept out of contact with the liquid of the needle, after retraction of the needles and the separation of the membranes, the surfaces of the membranes remain clean and free of any liquid residuals that otherwise could cause harm. The squeezing of the membranes 808 and 809 is enabled because the actuator 401 is disabled from being pushed deeper into the female connector, until the ledges 223 completely travel into the void portion 405 of the gears, as explained above. When the ledges 223 pass through gaps 406, the membrane 809 of the male connector pushes the membrane 808 of the actuator, causing the actuator 401 to move deeper into the connector and thereby urge the gears 402 to rotate. This rotation, however, is disabled and blocked because the gaps 406 in gears 402 hit the ledges 223 from the side and are incapable of rotating until the ledges 223 completely pass through gaps 406 into the void portion 405 of the gears. Once the ledges 223 are completely inside the void portion 405 of the gears, the gears 402 begin to rotate and the actuator is enabled to descend deeper into the female connector. Sufficient squeezing of the two membranes together is obtained by determining, inter alia, the distance between gaps 406 and membrane 808, and between ledges 223 and membrane 809, such that while ledges 223 are traveling through gaps 406, membranes 808 and 809 are sufficiently squeezed together.

As long as the ledges 223 are inside the void portion 405 of the gears, the membranes remain locked to each other in a constant size of compression, and resultantly the one or more needles are secured inside the vial, allowing substance to be transferred through the needle(s) without the risk of sudden disengagement of the male and female connectors. Since the connection of the female to male connector is a single smooth axial motion for the user, the described mechanism allows a precise control of the points where: a) the membranes are squeezed and secured; b) the point when needle/s can penetrate the membranes; c) the point when needle/s fully retract from the membranes; d) the point when membranes can safely separate.

While it is convenient to have two arrangements of gear and ladder, on different sides of the female connector and of the actuator, it is possible to employ only a single gear-ladder coupling, and of course it is possible to use more than two such couplings. Accordingly, the invention is not limited to any specific number of such elements.

Figure 14:
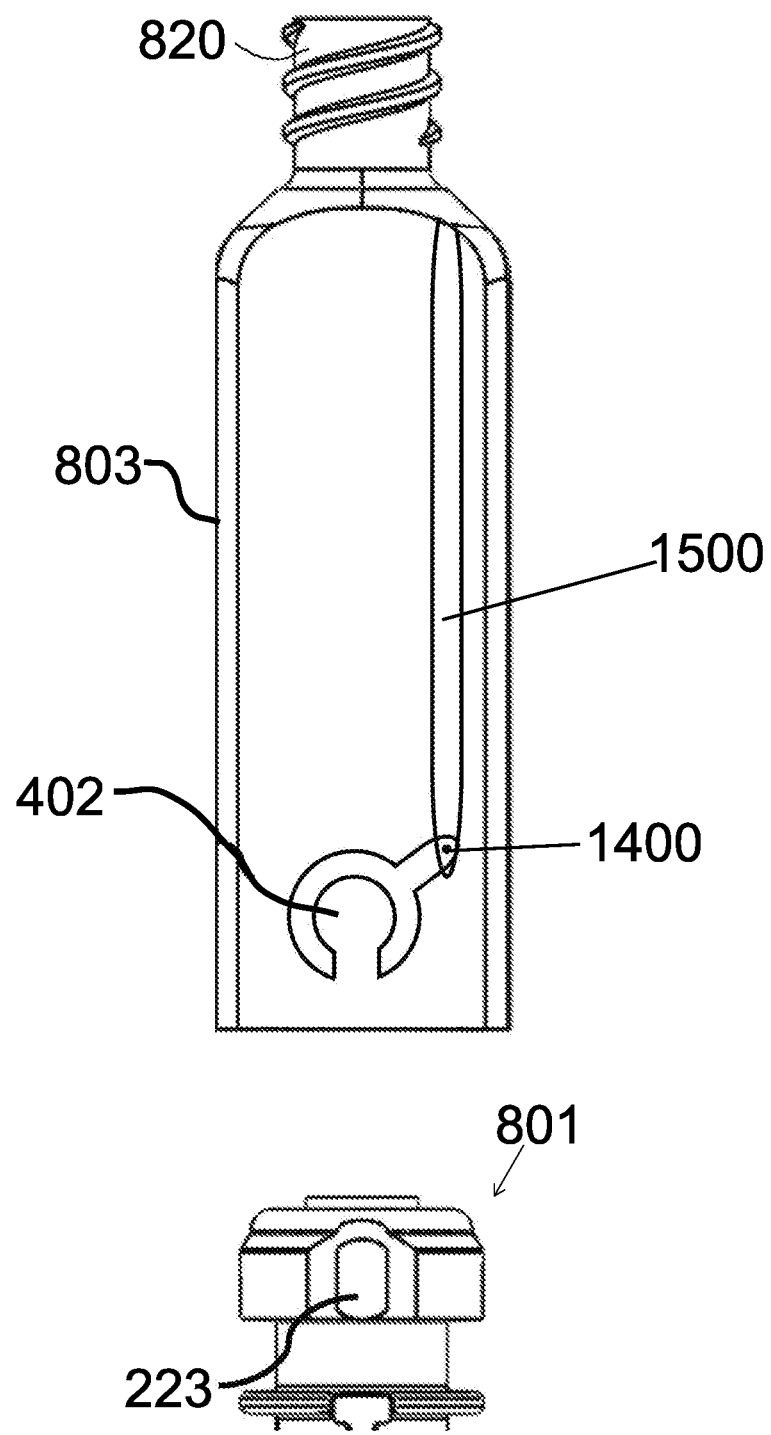
FIG. 14 schematically illustrates an assembly using an alternative gear combination.

An alternative embodiment of the invention is shown in FIG. 14 in which a female connector 803 is provided with a rotatable gear 402 arranged on securing actuator (not shown) similarly to FIGS. 5, 6, 8-10 and 12, which is free to move around its center axis. A sprocket of the gear is rotatably attached at axis 1400, which is positioned at a radial distance from the center of gear 402. That axis is made on element 1500 that is flexible to bend sideward. When gear 402 engages anchoring ledge 223, which is further pushed upwards into female connector 803, rotatable gear 402 rotates and remains coupled with anchoring ledge 223 of connector 801, of which only the upper part is shown in the figure. The flexibility to bend of the element 1500 allows the axis 1400 to be moved slightly sideward by the rotation of gear 402. As will be apparent to the skilled person, many different mechanical setups can be provided according to the invention to provide axis 1400 with the freedom to move slightly sideward, for example the element 1500 can be rigid but have a slit-shaped window within which the axis 1400 can move.

It is noted that an apparatus for securing a male-female connection according to the present invention may be utilized for various applications and devices. The present invention is not limited to the male-female connection of a drug transfer system, and may be used in male-female connections of other devices and apparatuses.

Although embodiments of the invention have been described by way of illustration, it will be understood that the invention may be carried out with many variations, modifications, and adaptations, without exceeding the scope of the claims.

The invention claimed is:

1. An apparatus for securing a male-female connection, comprising:
   (a) a female connector comprising a securing actuator section; and
   (b) a male connector comprising at least one anchoring ledge;
   said securing actuator section comprising at least one rotatable gear having one or more sprockets and a void portion, said void portion being configured to receive therewithin, through a gap formed in said at least one rotatable gear, said at least one anchoring ledge, said at least one rotatable gear being configured to rotate and change an orientation of the gap with the anchoring ledge received within the void portion, thereby locking the anchoring ledge therewithin.

2. The apparatus according to claim 1, wherein one or more rungs are formed on:
   the female connector.

3. The apparatus according to claim 2, wherein at least one rail or guide is formed on the interior of the female connector.

4. The apparatus according to claim 3, wherein a track is provided between the at least one rail or guide and the one or more rungs, along which the at least one rotatable gear may travel longitudinally.

5. The apparatus according to claim 1, wherein each of the female connector and the male connector is coupled to an element of a fluids-transfer system.

6. The apparatus according to claim 1, wherein one or both of the female connector and the male connector are integral part of an element of a fluids-transfer system.

7. The apparatus according to claim 1, wherein the female connector is connected to one of the following:
   a) a syringe;
   b) a female luer or luer-lock port or male luer or luer-lock port;
   c) tubing; and
   d) a spike.

8. The apparatus according to claim 1, wherein the male connector is connected to one of the following:
   a) a vial adaptor;
   b) a spike;
   c) a female luer or luer-lock port or male luer or luer-lock port; and
   d) tubing.

9. The apparatus according to claim 1, wherein an axis around which the at least one rotatable gear rotates is perpendicular to a plane in which lies another axis along which the female and male connectors slide.

10. An element of a fluids-transfer system coupled, or otherwise connected to, the female connector as claimed in claim 1.

11. An element of a fluids-transfer system coupled, or otherwise connected to, the male connector as claimed in claim 1.

12. A drug-transfer system, comprising the apparatus as claimed in claim 1.

13. A syringe adaptor, comprising the apparatus as claimed in claim 1.

14. A tubing, comprising the apparatus as claimed in claim 1.

15. The apparatus according to claim 1, wherein the at least one rotatable gear is a component of a mechanism that comprises at least one of the following:
   a) two rungs and one sprocket;
   b) at least one indentation suitable to be engaged by a rung;
   c) a rung which is adapted to be engaged by two sprockets; and
   d) a rung adapted to engage an indentation.

16. The apparatus according to claim 1, wherein the at least one rotatable gear is rotatably attached to an axis positioned at a radial distance from a center axis of said at least one rotatable gear.

17. A connector for securing a male-female connection in a fluids-transfer system, comprising at least one rotatable gear comprising a void portion configured to receive therewithin, through a gap formed in said at least one rotatable gear, at least one anchoring ledge associated with another connector of the fluids-transfer system, said at least one rotatable gear being configured to rotate and change an orientation of the gap with the anchoring ledge received within the void portion, thereby locking the anchoring ledge therewithin.

18. An element of a fluids-transfer system coupled, or otherwise connected to, the connector as claimed in claim 17.

* * * * *